(12) United States Patent
Morita

(10) Patent No.: US 6,727,681 B2
(45) Date of Patent: Apr. 27, 2004

(54) POWER SUPPLY CIRCUIT AND CONTROL METHOD FOR THE SAME

(75) Inventor: Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 39 days.

(21) Appl. No.: 10/251,501

(22) Filed: Sep. 20, 2002

(65) Prior Publication Data

US 2003/0067289 A1 Apr. 10, 2003

(30) Foreign Application Priority Data

Sep. 21, 2001 (JP) ........................................ 2001-289191

(51) Int. Cl.[7] .............................. G05F 1/40; G09G 5/00
(52) U.S. Cl. ....................................... 323/282; 345/211
(58) Field of Search ................................ 323/273, 280, 323/282, 283; 345/95, 210, 211

(56) References Cited

U.S. PATENT DOCUMENTS 6,236,394 B1 * 5/2001 Ikeda ........................... 345/211
6,317,122 B1 * 11/2001 Yamazaki .................... 345/211
6,366,065 B1 * 4/2002 Morita ......................... 323/280
6,529,182 B1 * 3/2003 Burton ........................ 345/102
6,603,294 B2 * 8/2003 Morita ......................... 323/280

* cited by examiner

*Primary Examiner*—Adolf D. Berhane
(74) *Attorney, Agent, or Firm*—Michael T. Gabrik

(57) ABSTRACT

A power supply circuit and control method enable faster startup after the power source turns on, and then supplies power with high efficiency to keep power consumption low. The power supply circuit has a charge pump step-down circuit, a first regulator, a switching circuit, and a switching control circuit. The step-down circuit steps down the power supply potential VDD to generate a step-down potential by charge pumping based on a step-down clock supplied from the LCD controller. When the system power source turns on a switching signal generated by the switching control circuit causes the switching circuit to select and output the adjusted potential from the first regulator as the output voltage VOUT. When a subsequent switching signal is applied the switching circuit selects and outputs the step-down potential from the step-down circuit as the output voltage VOUT. The step-down circuit may output a step-down potential after the potential is adjusted by a second regulator.

21 Claims, 19 Drawing Sheets

(A)

(B)

(C)

POWER SUPPLY CIRCUIT AND CONTROL METHOD FOR THE SAME

BACKGROUND OF THE INVENTION

1. Field of the Invention

The present invention relates to a power supply circuit and to a control method for the same.

2. Description of the Related Art

In a liquid crystal display device, for example, a scanning line drive circuit and a signal line drive circuit are used to drive a liquid crystal panel having scanning lines and signal lines arrayed in a matrix. The scanning line drive circuit drives scanning on the scanning lines and the signal line drive circuit applies data signals to the signal lines. The scanning line and signal line drivers operate synchronously in order to display something on the liquid crystal panel. The display timing and operation of the scanning and signal line drive circuits are controlled by a liquid crystal display (LCD) controller (also simply called a display controller).

The drive voltage of the scanning line drive circuit and the signal line drive circuit differ, however, depending upon the liquid crystal material used in the liquid crystal panel and the LCD driving method. Therefore, because the scanning line drive circuit and signal line drive circuit are manufactured in processes with a voltage resistance determined by the drive voltage, the drive voltage supplied to each may differ. The display controller integrates complex circuitry, and may therefore be manufactured in a low voltage process.

An LCD therefore has a power supply circuit to supply the appropriate supply voltage to the various circuits driving the liquid crystal panel. The power supply circuit generates these different voltages based on an externally supplied system power supply.

One type of power supply circuit has a charge pump type step-up/step-down circuit as the circuit for generating the various voltages. A charge pump type step-up/step-down circuit can generate voltage stepped up or down in the positive or negative direction with high efficiency and low power consumption as a result of charge pumping using switching elements. The charge pump type step-up/step-down circuit needs a switching control signal (step-up clock, step-down clock) to control the switching elements. If this switching control signal is supplied from the display controller, the user can supply a switching control signal at a frequency at which optimum step-up or step-down efficiency can be achieved.

When the system power supply turns on, however, the display controller cannot generate this switching control signal because the appropriate supply voltage is not supplied from the power supply circuit. Furthermore, because the switching control signal is not supplied, the charge pump type step-up/step-down circuit of the power supply circuit cannot generate the appropriate voltage. A series regulator is therefore used to generate the supply voltage in order to accelerate system startup after the power supply is turned on. A problem with using a series regulator, however, is that efficiency is low and power consumption increases.

OBJECTS OF THE INVENTION

The present invention is directed to solving these technical problems. Accordingly, an object of the invention is to provide a power supply circuit and control method enabling quick startup after the power supply is turned on while also providing high efficiency and low power consumption.

SUMMARY OF THE INVENTION

To achieve these objects, a power supply circuit for generating a third potential based on a first potential and a second potential is provided. According to one aspect of the invention, the power supply comprises a step-down circuit for generating, based on a switching control signal, a step-down potential by stepping down the second potential using a charge pumping operation; a first potential adjusting circuit for generating an adjusted potential by adjusting the second potential; and a switching circuit for selecting and outputting as the third potential either the step-down potential or the adjusted potential based on a switching signal.

Such a power supply circuit advantageously has both high efficiency and low power consumption provided by the step-down circuit and high drive capacity provided by the first potential adjusting circuit.

Preferably, the step-down circuit comprises a second potential adjusting circuit for adjusting the step-down potential generated by stepping down the second potential. As a result of the second potential adjusting circuit adjusting the potential of the step-down potential, this power supply circuit can supply the third potential as a stable power supply.

Preferably, the switching signal changes after a specific period of time following turn on of the power supply, and the switching circuit switches from outputting the adjusted potential as the third potential to outputting the step-down potential as the third potential when the switching signal changes. This accelerates startup in the period just after the system power supply turns on, and once the system stabilizes makes it possible to supply power with high efficiency and low power consumption.

According to another aspect, the power supply circuit comprises a step-down circuit for generating, based on a switching control signal, a step-down potential by stepping down the second potential using a charge pumping operation; a switching circuit for selecting and outputting as a fourth potential either the step-down potential or the second potential based on a switching signal; and a potential adjusting circuit for adjusting the fourth potential to the third potential.

In this power supply circuit the potential adjusting circuit adjusts the fourth potential, which was selected from either the step-down potential or the second potential, to output the third potential. It is therefore possible to provide a power supply circuit able to advantageously utilize both high efficiency and low power consumption provided by the step-down circuit and high drive capacity of the potential adjusting circuit. Furthermore, because the potential adjusting circuit is located after potential selection, the size of the circuit can be reduced compared with a configuration in which potential adjustment is disposed before potential selection and output.

Preferably, the specific switching signal changes after a specific period of time following turn on of the power supply, and the switching circuit switches from outputting the second potential to outputting the step-down potential to when the switching signal changes. Thus comprised, the second potential is potential adjusted and output as the third potential until the specified period ends; then and after the specific period ends, the potential of the step-down potential is adjusted and output as the third potential. This accelerates startup in the period just after the system power supply turns on, and once the system stabilizes makes it possible to supply power with high efficiency and low power consumption. Furthermore, because the potential adjusting circuit is located after potential selection, circuit scale can be reduced compared with a configuration in which potential adjustment is before potential selection and output.

Preferably, the switching signal changes according to a result of a monitoring circuit monitoring the step-down potential or the third potential. This power supply circuit controls potential selection based on the condition of the step-down potential or the third potential, and can therefore supply power while optimizing control with respect to drive capacity, efficiency, and power consumption.

Preferably, at least the third potential is supplied to a source circuit that supplies the switching control signal. Thus, the third potential can be supplied to the source circuit supplying the switching control signal required for the charge pumping operation enabling high efficiency and low power consumption. It is therefore possible to enable a faster rise after the system power supply turns on without supplying power using only a series regulator, and power can be supplied with high efficiency and low power consumption.

Preferably, the voltage resistance of the source circuit supplying the switching control signal is lower than the voltage resistance of a source circuit supplying the second potential. Thus, faster startup after the system power supply turns on can be achieved and a high efficiency, low power consumption power supply can be maintained even when the source circuit supplying the specific switching control signal requires a power supply with lower potential due to advances in manufacturing processes.

Preferably, the source circuit supplying the switching control signal is a display controller. Thus comprised, the present invention makes it possible to achieve a display apparatus whereby startup is faster after the system power supply turns on and power can be supplied with high efficiency and low power consumption.

In accordance with another aspect of the invention, a method for controlling a power supply circuit that generates a third potential based on a first potential and a second potential is provided. The method comprises the steps of outputting as the third potential an adjusted potential generated by adjusting the second potential; generating a step-down potential by stepping down the second potential using a charge pumping operation based on switching control signal; and switching, based on a switching signal, from outputting the adjusted potential as the third potential to outputting the step-down potential as the third potential.

Another method for controlling a power supply circuit that generates a third potential based on a first potential and a second potential comprises the following steps: outputting as the third potential an adjusted potential generated by adjusting the second potential; generating a step-down potential by stepping down the second potential using a charge pumping operation based on a switching signal; and switching, based on a switching signal, from outputting the adjusted potential to adjusting the step-down potential and outputting the adjusted step-down potential as the third potential.

Other preferable features of the invention include the following.

The switching signal changes after a specific period of time, and the change occurs according to a result of a monitoring circuit monitoring the step-down potential or the third potential.

At least the third potential is supplied to the source circuit supplying the switching control signal, that source circuit having a lower voltage resistance than the voltage resistance of the source circuit supplying the second potential.

The source circuit supplying the specific switching control signal is a display controller.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5(A) shows a b/a step-down circuit in which the power source is stepped up by a factor of b, potential-adjusted by a regulator, and then stepped down 1/a; FIG. 5(B) shows a step-down circuit in which the power source is stepped up by a factor of b and then stepped down 1/a, and the potential is then adjusted by a regulator; and FIG. 5(C) shows a step-down circuit whereby the power source is directly stepped down b/a;

DESCRIPTION OF THE PREFERRED EMBODIMENTS

A preferred embodiment of the present invention is described below with reference to the accompanying figures. It will be noted that the following embodiments are shown by way of description only and are not intended to limit the scope of the invention. Furthermore, not all elements of the configurations described below as embodiments of the present invention are essential to the means whereby the present invention solves the above-described problems.

1. Liquid Crystal Display Device (Display Device)

The basic configuration of a liquid crystal display (LCD) employing a power supply circuit according to the following first and second embodiments of the invention is described below.

Figure 1:
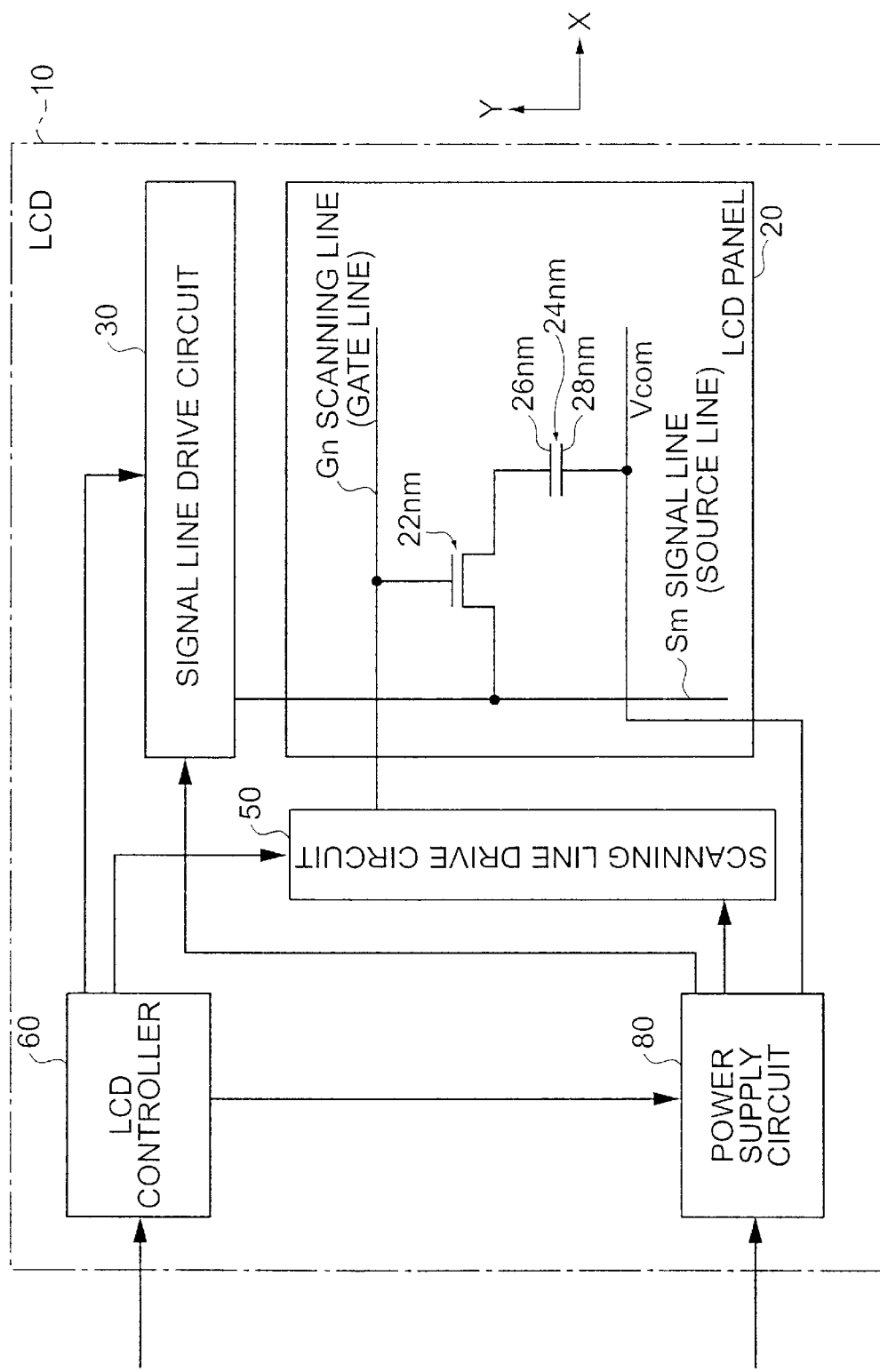
FIG. 1 is a block diagram showing the configuration of an LCD with a power supply circuit.

As shown in FIG. 1, an LCD (or more broadly a display device) 10 has an LCD panel 20, signal line drive circuit 30, scanning line drive circuit 50, LCD controller (display controller) 60, and power supply circuit 80.

The LCD panel 20 (electro-optical device) is formed, for example, on a glass substrate. A plurality of scanning (or gate) lines $G_1$ to $G_N$ (where N is a natural number of 2 or more) extending in the X direction are arrayed in the Y direction, and a plurality of signal (or source) lines $S_1$ to $S_M$ (where M is a natural number of 2 or more) extending in the Y direction are arrayed in the X direction on this glass substrate. Thin Film Transistor (TFT) $22_{nm}$, which functions as a switching element, is disposed at the intersection of scanning line $G_n$ (where n is a natural number and $1 \leq n \leq N$) and signal line $S_m$ (where m is a natural number and $1 \leq m \leq M$).

The gate electrode of TFT $22_{nm}$ is connected to scanning line $G_n$, the source electrode is connected to signal line $S_m$, and the drain electrode is connected to pixel electrode $26_{nm}$ of liquid crystal capacitor (more generally, liquid crystal element) $24_{nm}$. The gap between pixel electrode $26_{nm}$ and opposing electrode $28_{nm}$ in liquid crystal capacitor $24_{nm}$ is filled with liquid crystals, and the transmittance of the pixel changes according to the applied voltage between these opposing electrodes. Voltage Vcom generated by power supply circuit 80 is supplied to the opposing electrode $28_{nm}$.

The signal line drive circuit 30 drives signal lines $S_1$ to $S_M$ of the LCD panel 20 based on the image data for one horizontal scanning unit. The signal line drive circuit 30 has a register for specifying whether to drive the signal lines one at a time or as a unit of plural signal lines. The register is set by the LCD controller 60.

The scanning line drive circuit 50 sequentially scans scanning lines $G_1$ to $G_N$ of the LCD panel 20 synchronized to the horizontal synchronization signal during one vertical scanning period. The scanning line drive circuit 50 similarly has a register for specifying whether to drive the scanning lines one at a time or in units of plural scanning lines simultaneously. This register is also set by the LCD controller 60.

The LCD controller 60 controls the signal line drive circuit 30, scanning line drive circuit 50, and power supply circuit 80 according to content set by a host such as a CPU (not shown in the figure). More specifically, the LCD controller 60 supplies, for example, the operating mode setting, the signal line or scanning line to drive, or an internally generated vertical synchronization signal or horizontal synchronization signal to the signal line drive circuit 30 and scanning line drive circuit 50, and supplies the polarity inversion timing of Vcom to the power supply circuit 80.

The power supply circuit 80 generates the potential supplied to the various circuits having different voltage resistance according to the liquid crystal material and liquid crystal driving method. The power supply circuit 80 generates Vcom and the potential required for liquid crystal driving the LCD panel 20 based on the externally input system power supply potential. The potential needed for liquid crystal driving the LCD panel 20 is supplied to the signal line drive circuit 30, scanning line drive circuit 50, and LCD panel 20. Vcom is supplied to the opposing electrode disposed opposite the TFT pixel electrodes of the LCD panel 20.

An LCD 10 thus comprised displays externally supplied image data on the LCD panel 20 as a result of the LCD controller 60 cooperatively operating the signal line drive circuit 30, scanning line drive circuit 50, and power supply circuit 80 based on the image data.

The LCD 10 shown in FIG. 1 is configured with the LCD controller 60 and power supply circuit 80, but it will be noted that either or both the LCD controller 60 and power supply circuit 80 could be disposed externally to the LCD 10. Alternatively, the host could be built in to the LCD 10.

Furthermore, the signal line drive circuit 30 and scanning line drive circuit 50 are disposed externally to the LCD panel 20 in FIG. 1, but at least one of the signal line drive circuit 30 and scanning line drive circuit 50 could be formed on the same glass substrate as the LCD panel 20.

1.1 Power Supply Circuit and LCD Controller

Using a charge pump or switching regulator type step-up/step-down circuit is desirable from the perspective of power supply circuit efficiency (power conversion efficiency). A switching control signal (step-up or step-down clock signal for a charge pump circuit) for switching element control is required in this case. The LCD controller 60, for example, can supply this switching control signal.

The signal line drive circuit 30 is manufactured in, for example, a medium voltage resistance process for a 3-V voltage supply so that the signal line drive circuit 30 can drive the signal lines with the different voltages required for signal drive. The scanning line drive circuit 50 is a small circuit with a very simple design, and is manufactured in a high voltage resistance process for a supply voltage of 20 V to 50 V in order to drive the scanning lines with a high gate voltage. The LCD controller 60 has a complex circuit design to both provide memory for storing the display data, for example, and control the signal line drive circuit 30 and scanning line drive circuit 50, and is therefore manufactured in a high resolution, low voltage resistance process for a 1.8 V supply voltage.

As the voltage resistance of the LCD controller 60 decreases and the difference to the voltage resistance of the power supply circuit 80 increases, the power supply circuit 80 must use a step-down circuit to supply the appropriate potential to the LCD controller 60.

Figure 2:
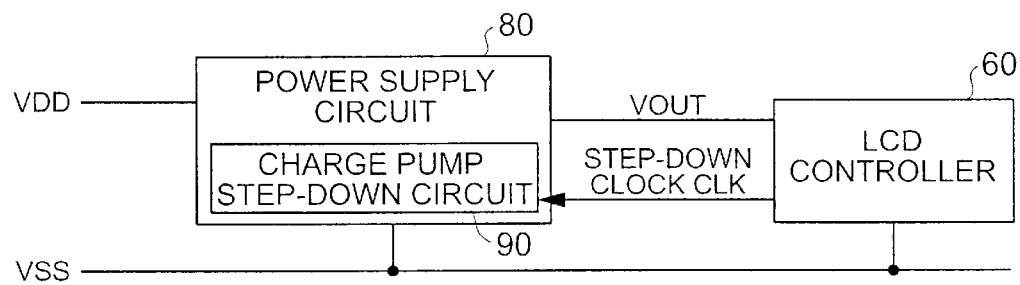
FIG. 2 shows the relationship between a power supply circuit and LCD controller.

FIG. 2 shows the relationship between the power supply circuit and LCD controller.

The power supply circuit 80 is described below having a charge pump step-down circuit 90, but a switching regulator type step-down circuit could be used instead.

The system ground potential VSS is connected to both the power supply circuit 80 and LCD controller 60. The system power supply potential VDD is supplied to the power supply circuit 80. Referenced to the system ground potential VSS and based on the power supply potential VDD, power supply circuit 80 generates the output voltage VOUT supplied to the LCD controller 60. The step-down circuit 90 of the power supply circuit 80 steps down the power supply potential VDD by charge pumping based on the step-down clock supplied from LCD controller 60.

Power supply to the LCD controller 60 is not sufficient when the power supply turns on, however, and a normal step-down clock therefore cannot be supplied to the power supply circuit 80.

This problem has conventionally been solved by using a series regulator in the power supply circuit 80 to generate the required potential when the power supply turns on. This, however, results in poor supply circuit efficiency and increased power consumption.

The power supply circuit described below therefore supplies the potential generated by a series regulator to at least the LCD controller 60 when the system power supply turns on, and when operation of the power supply circuit then stabilizes, the power supply circuit switches to supplying the potential generated by an efficient charge pump or switching regulator type step-down circuit. It should be noted that the generated potential can also be supplied to the signal line drive circuit 30 or scanning line drive circuit 50. It is thus possible to provide a power supply circuit enabling fast startup when the system power supply turns on, good efficiency, and low power consumption.

This power supply circuit is described below as having a charge pump step-down circuit, but a switching regulator type step-down circuit could be used instead.

Figure 3:
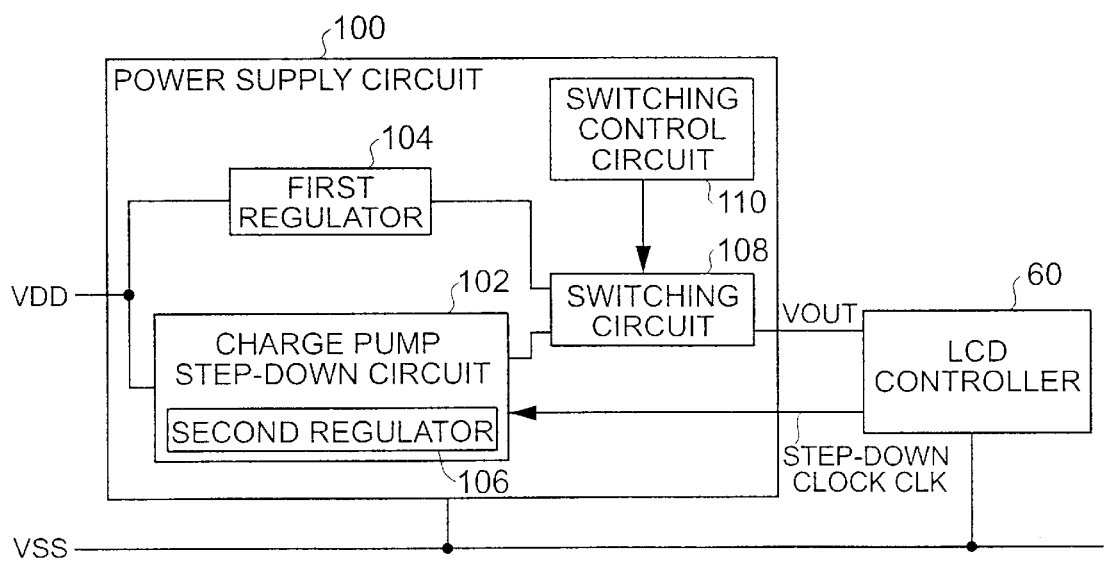
FIG. 3 is a block diagram of a power supply circuit according to a first embodiment of the invention.

2. Power Supply Circuit 2.1 Principle of the Power Supply Circuit Configuration 2.1.1 First Embodiment FIG. 3 is a block diagram showing the configuration of a power supply circuit according to a first embodiment of the present invention. This power supply circuit 100 can be used in the LCD 10 shown in FIG. 1. Note that the relationship between the power supply circuit 100 and LCD controller 60 is shown schematically in the figure.

The system ground potential VSS (first potential) connected to the LCD controller 60 is also connected to the power supply circuit 100. The power supply potential VDD (second potential) is also connected to the power supply circuit 100. Output voltage VOUT (third potential) generated by the power supply circuit 100 is supplied to the LCD controller 60.

The power supply circuit 100 has a charge pump step-down circuit 102, first regulator (potential adjustment circuit) 104, switching circuit 108, and switching control circuit 110.

The step-down circuit 102 steps down the power supply potential VDD to generate a step-down potential by the charge pumping operation based on the step-down clock CLK supplied from LCD controller 60.

It should be noted that a second regulator 106 could be provided in the step-down circuit 102. In this case the power supply potential VDD is stepped down by charge pumping based on the step-down clock CLK from the LCD controller 60 and the second regulator 106 then adjusts the potential of this stepped-down potential to regulate the step-down potential supplied to the switching circuit 108.

The first regulator 104 generates an adjusted potential by adjusting the potential of the power supply potential VDD.

The switching circuit 108 selects either the step-down potential or the adjusted potential based on a specific switching signal, and outputs the selected potential as output voltage VOUT. The switching control circuit 110 generates the switching signal applied to the switching circuit 108.

When the power supply turns on, the switching circuit 108 of power supply circuit 100 is controlled by this switching signal to select and output the adjusted potential generated by the first regulator 104 as output voltage VOUT. The switching circuit 108 is then controlled by the switching signal to select and output the step-down potential generated by the step-down circuit 102 (or second regulator 106) as output voltage VOUT.

2.1.2 Second Embodiment

Figure 4:
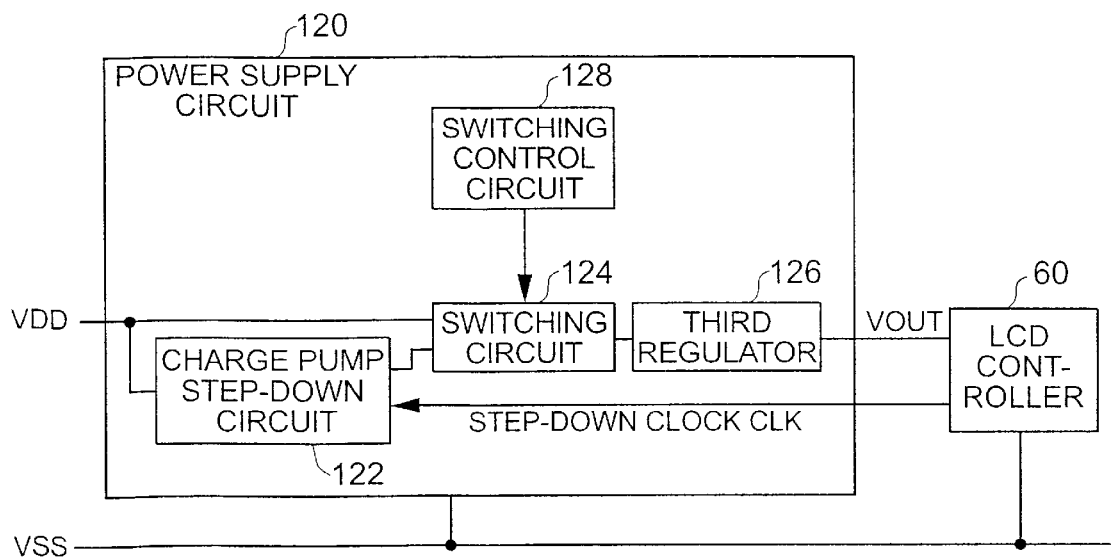
FIG. 4 is a block diagram of a power supply circuit according to a second embodiment of the invention.

FIG. 4 shows the configuration of a power supply circuit according to a second embodiment of the invention. This power supply circuit 120 can be used in the LCD 10 shown in FIG. 1. Note that the relationship between the power supply circuit 120 and LCD controller 60 is shown schematically in FIG. 4.

The system ground potential VSS (first potential) connected to the LCD controller 60 is also supplied to the power supply circuit 120. The power supply potential VDD (second potential) is also connected to the power supply circuit 120. Output voltage VOUT (third potential) generated by the power supply circuit 120 is supplied to the LCD controller 60.

The power supply circuit 120 has a charge pump step-down circuit 122, switching circuit 124, third regulator 126, and switching control circuit 128.

Similarly to the step-down circuit 102 shown in FIG. 3, step-down circuit 122 steps down the power supply potential VDD to generate a step-down potential by a charge pumping operation based on the step-down clock CLK supplied from LCD controller 60.

The switching circuit 124 selects and outputs power supply potential VDD or the step-down potential as a selected potential (fourth potential) based on a specific switching signal.

The third regulator 126 adjusts the potential of the selected potential, that is, the potential selected by switching circuit 124, to generate output voltage VOUT.

The switching control circuit 128 generates the switching signal applied to the switching circuit 124.

When system power turns on, the switching circuit 124 of power supply circuit 120 is controlled by the applied switching signal to select and output the power supply potential VDD. Therefore, when the system power supply turns on the potential of power supply potential VDD is adjusted by the third regulator 126 to output voltage VOUT.

When a switching signal is again applied the switching circuit 124 selects and outputs the step-down potential generated by the step-down circuit 122, and the third regulator 126 adjusts the potential to generate the output voltage VOUT.

Thus, from the foregoing description, it will be understood that in the first and second embodiments of the invention the system power supply potential is adjusted when the system power supply turns on to output a specific power supply potential, and then when the system then stabilizes, a switching signal is applied to switch to the potential generated by a charge pump step-down circuit to output the power supply potential. It is thus possible to provide a power supply circuit enabling fast startup when the system power supply turns on, high efficiency, and low power consumption.

2.2 Configuration of Selected Parts 2.2.1 Step-Down Circuit

Figure 5:
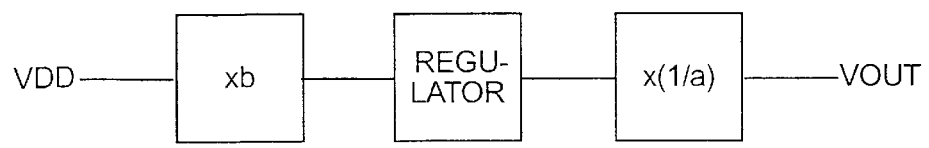
Figure 5:
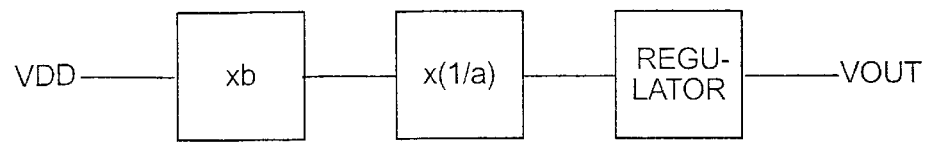
Figure 5:
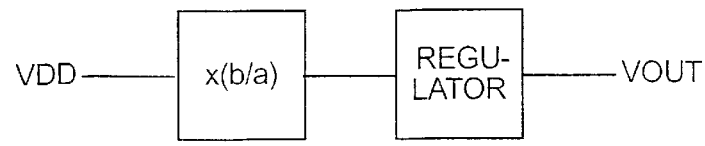

A b/a step-down is achieved with a first configuration as shown in FIG. 5(A) by first stepping up power supply potential VDD b times, then adjusting the potential with the regulator, and then stepping down the result 1/a times to produce output voltage VOUT. This first configuration is desirable when a b step-up circuit is required in the power supply circuit for another application, and a 1/a step-down circuit can be easily achieved.

With the second configuration shown in FIG. 5(B) the power supply potential VDD is first stepped up b, then stepped down 1/a, and the potential is then adjusted by a regulator to produce output voltage VOUT. This second configuration is desirable when a circuit for stepping up the potential a factor of c after a b step-up is present in the power supply circuit for some other application. A regulator may be provided to stabilize the power supply after the 1/a step-down because a regulator is not provided in the signal path after the b step-up.

The third configuration shown in FIG. 5(C) immediately steps down power supply potential VDD b/a, and adjusts the potential with a regulator to generate output voltage VOUT. This third configuration provides a circuit for directly generating the potential for a specific purpose, and is desirable because the circuit size is small.

Examples of circuit configurations achieving these various step-down circuits with a charge pump circuit design are described next.

Figure 6:
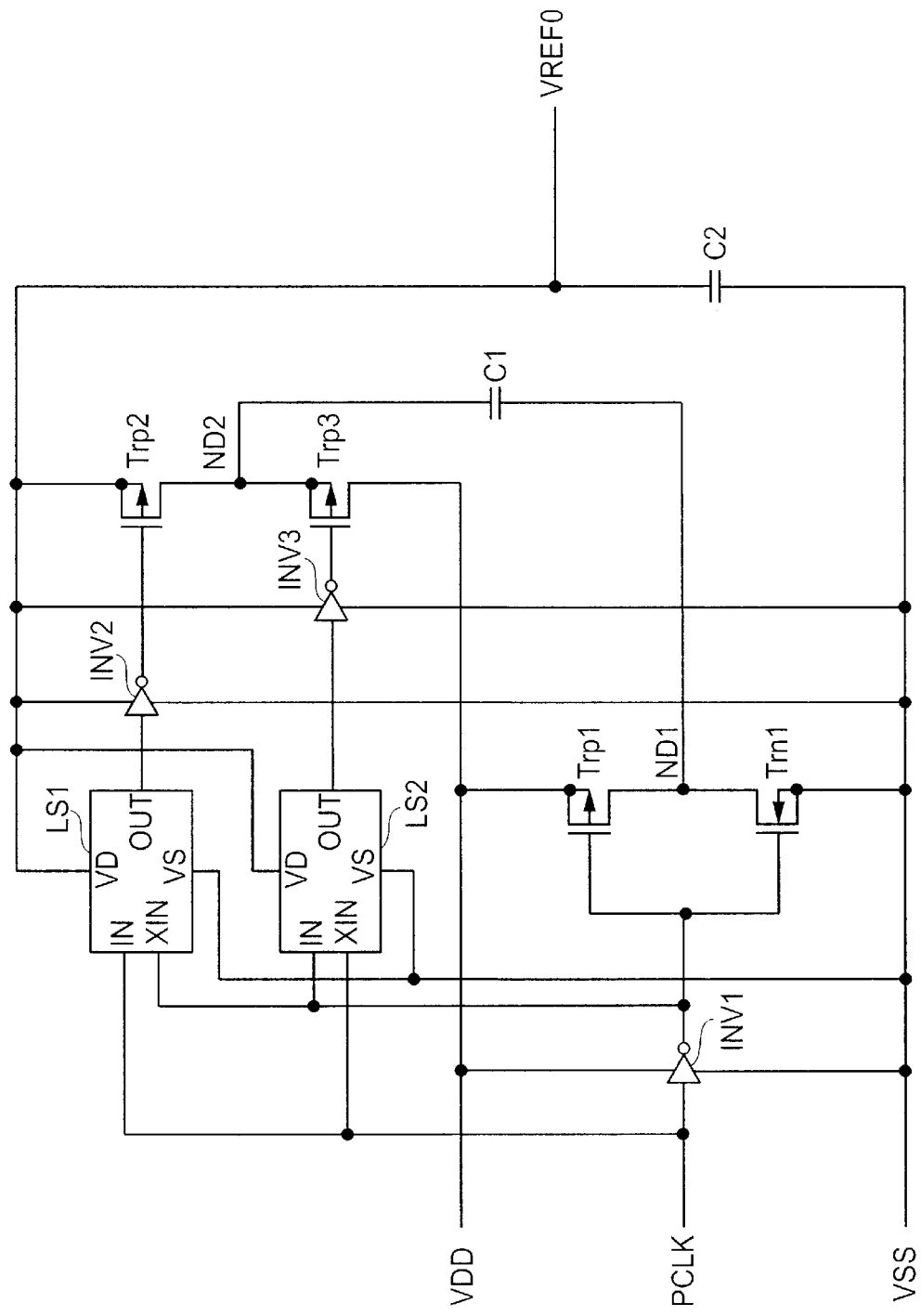
FIG. 6 is a block diagram of a charge pump type voltage-doubling step-up circuit.

FIG. 6 shows an exemplary charge pump type voltage doubling step-up circuit. Referenced to system ground potential VSS, this step-up circuit steps up power supply potential VDD twice to generate output potential VREF0. This step-up circuit can be used as a circuit for stepping up the power supply potential of the above charge pump step-down circuit.

In this step-up circuit the drains of Trp1 and Trn1 are connected to a common node ND1 between the power supply line to which power supply potential VDD is supplied and the system ground line to which system ground potential VSS is supplied. Trp1 is also connected to the system power line. Series-connected Trp2 and Trp3 are disposed between the power output line from which output potential VREF0 is taken and the system power supply line. Trp3 is connected to the system power line.

Regarding the notation, it will be understood that Trpx (where x=1 to 3) is a PMOS transistor used as a switching element, and Trn1 is an NMOS transistor used as a switching element.

Capacitor C1 is connected between the drain of Trp1 (also the drain of Trn1) and the drain of Trp2 (also the source of Trp3). Capacitor C2 is connected between the power output line and the ground line.

The output of inverter circuit INV1 is connected to the gates of Trp1 and Trn1. Clock signal PCLK is supplied as a switching control signal to the input of inverter circuit INV1.

Level shifters LS1 and LS2 shift the level of clock signal PCLK. The output of LS1 is inverted by INV2 and supplied to the gate of Trp2, and the output of LS2 is inverted by INV3 and supplied to the gate of Trp3. Level shifters LS1 and LS2 increase the difference in the potential supplied to IN and XIN to the potential difference between output potential VREF0 and system ground potential VSS.

The initial potential of output potential VREF0 goes to power supply potential VDD by way of Trp3 and Trp2. This is because Trp3 is a p-type transistor and the potential of the source or drain area is lower than the well.

Figure 7:
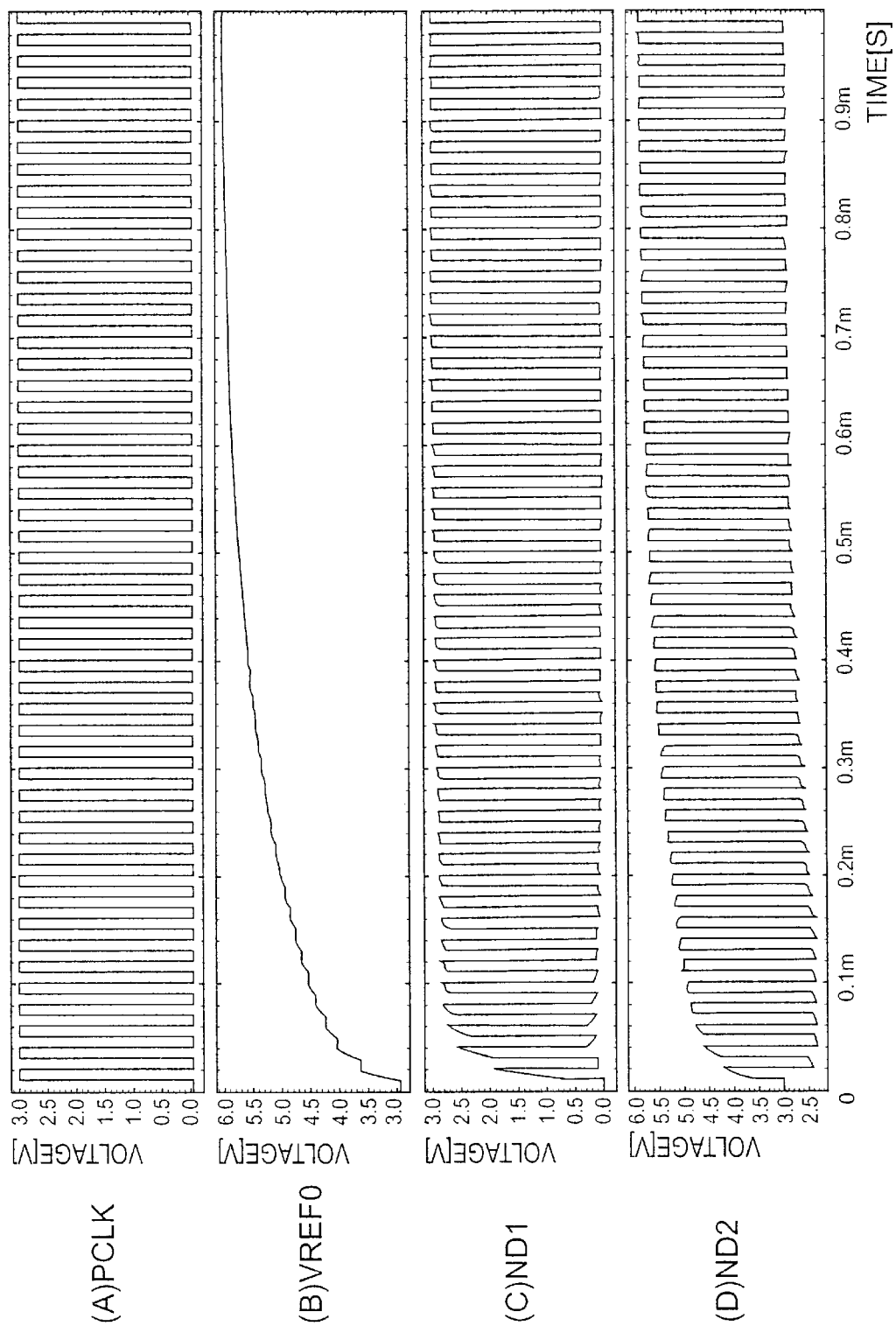
FIG. 7(A) is a timing chart of the step-down clock of the charge pump type voltage-doubling step-up circuit shown in FIG. 6.
FIG. 7(B) is a timing chart showing a change in the output potential of the charge pump type voltage-doubling step-up circuit shown in FIG. 6.
FIG. 7(C) is a timing chart showing a change in the potential at node ND1 in the charge pump type voltage-doubling step-up circuit shown in FIG. 6.
FIG. 7(D) is a timing chart showing a change in the potential at node ND2 in the charge pump type voltage-doubling step-up circuit shown in FIG. 6.

Clock signal PCLK then changes between power supply potential VDD and system ground potential VSS as shown in FIG. 7(A). When clock signal PCLK is logic low, Trp1 is off, Trn1 is on, Trp2 is off, and Trp3 is on, and the potential difference between VDD and VSS is applied to capacitor C1. When clock signal PCLK is logic high, Trp1 is on, Trn1 is off, Trp2 is on, and Trp3 is off, and capacitor C1 supplies a potential that is higher than VDD by the stored charge to output potential VREF0 (FIGS. 7(C) and 7(D)).

As shown in FIG. 7(B), the result is that a charge corresponding to a potential boosted to twice power supply potential VDD referenced to system ground potential VSS accumulates in capacitor C2, and a potential twice power supply potential VDD is supplied as the output potential.

Figure 8:
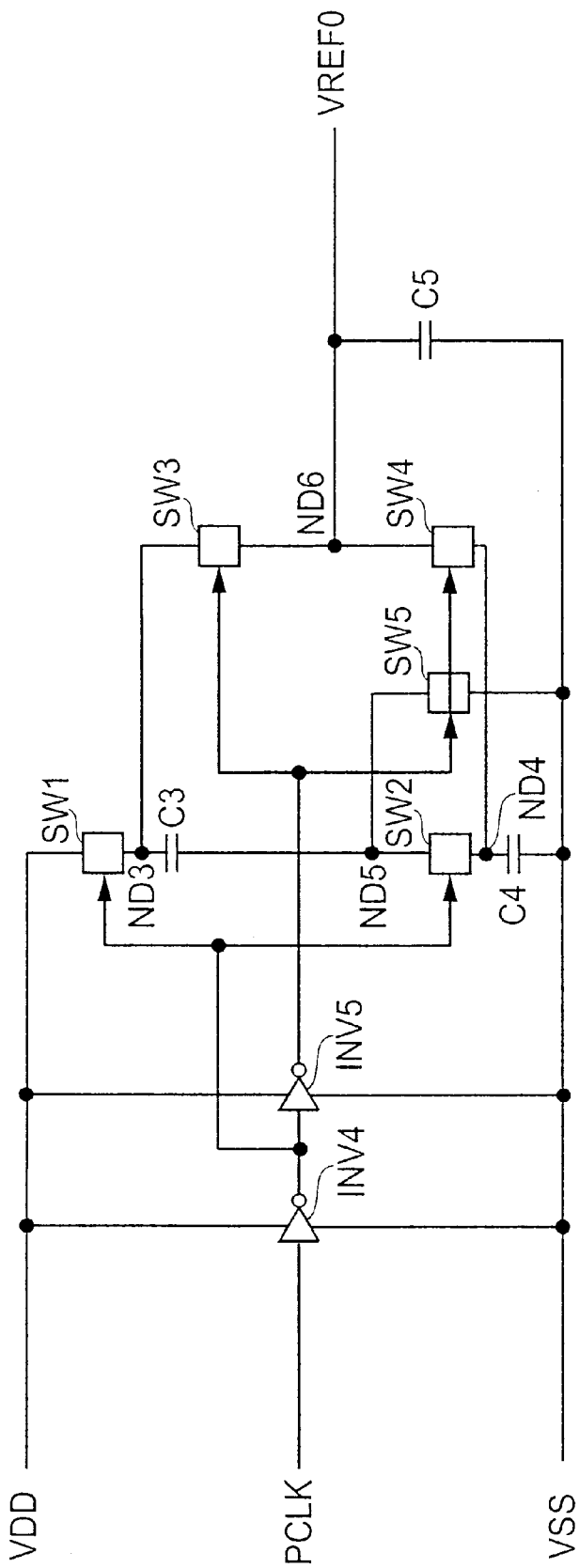
FIG. 8 is a block diagram of a charge pump type ½ step-down circuit.

FIG. 8 shows the configuration of an exemplary charge pump type ½ step-down circuit. This step-down circuit steps down the potential of power supply potential VDD to ½ referenced to system ground potential VSS to generate output potential VREF0. This step-down circuit can be applied as a circuit for stepping down the stepped-up potential of the power supply potential of the charge pump step-down circuit, or as a circuit for simply stepping down the power supply potential.

It should be noted that the switching elements SW are shown as blocks that are conductive when the logic of the control signal, indicated by the arrow, is high and non-conductive when the control signal logic is low. This type of switching element SW can be achieved using transistors or transfer gates.

This step-down circuit is arranged so that two capacitors are connected in series or parallel between the system power supply line and the ground line. In the illustrated embodiment, switch SW1, capacitor C3, switch SW2, and capacitor C4 are connected in series between the power supply line and ground line. Series-connected switches SW3 and SW4 are inserted between nodes ND3 and ND4. SW5 is inserted between node ND5 and the ground line. The power output line is connected to node ND6. Capacitor C5 is connected between the power output line and ground line.

Switches SW1 and SW2 are connected by the output signal of inverter circuit INV4 to which clock signal PCLK is input. Switches SW3, SW4, SW5 are controlled by the output signal from inverter circuit INV5. The output terminal of inverter circuit INV4 is connected to the input terminal of inverter circuit INV5.

Figure 9:
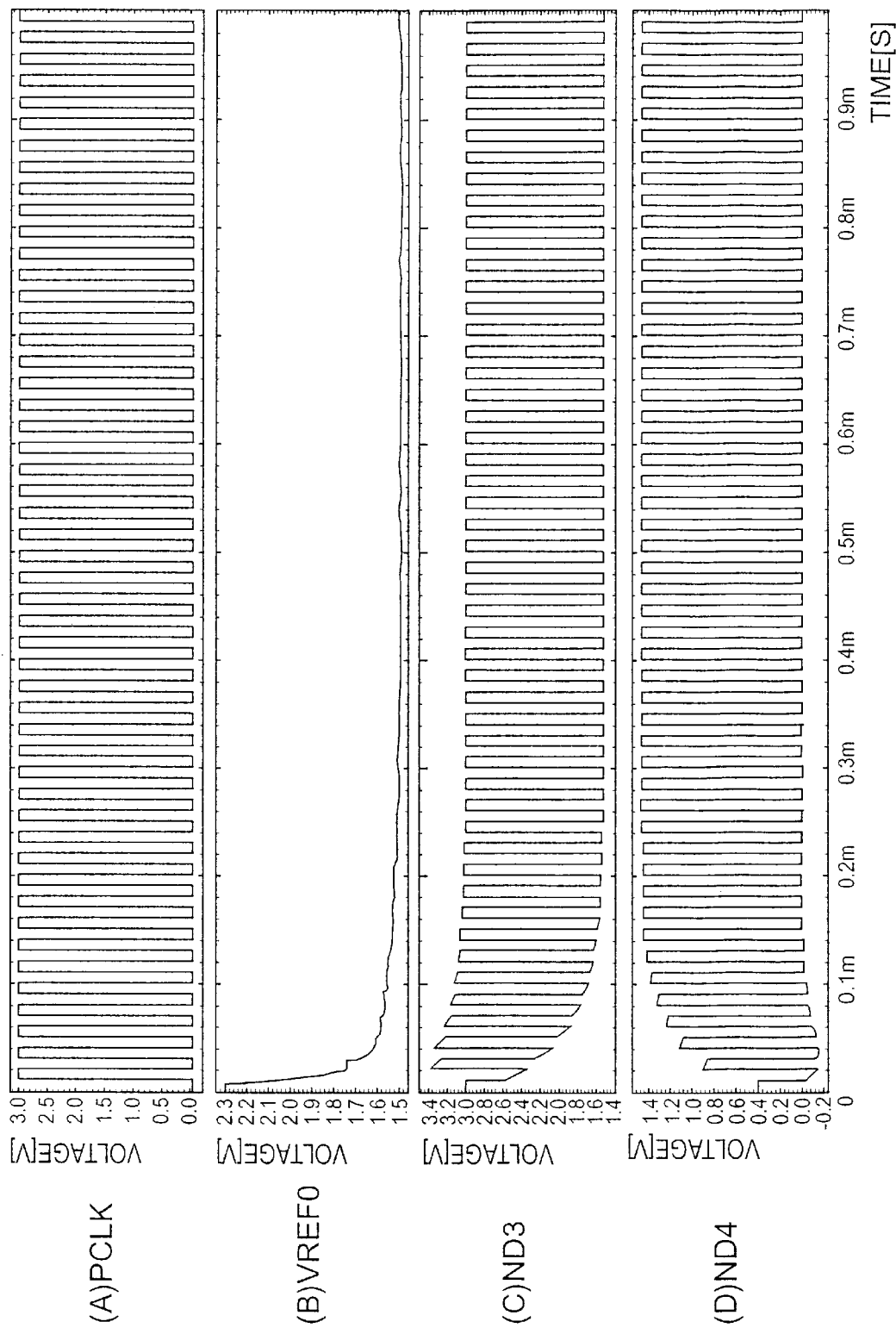
FIG. 9(A) is an exemplary timing chart of the step-down clock of the charge pump type ½ step-down circuit shown in FIG. 8.
FIG. 9(B) is a timing chart showing a change in the output potential of the charge pump type ½ step-down circuit shown in FIG. 8.
FIG. 9(C) is a timing chart showing a change in the potential at node ND3 in the charge pump type ½ step-down circuit shown in FIG. 8.
FIG. 9(D) is a timing chart showing a change in the potential at node ND4 in the charge pump type ½ step-down circuit shown in FIG. 8.

As shown in FIG. 9(A), clock signal PCLK changes between power supply potential VDD and system ground potential VSS with a step-down circuit thus comprised. When clock signal PCLK is low, SW1 and SW2 are on, SW3 to SW5 are off, and capacitors C3 and C4 are connected in series between the power supply line and ground. When clock signal PCLK goes high, SW1 and SW2 go off, SW3 to SW5 go on, and capacitors C3 and C4 are parallel connected between the power output line and ground. Half the charge stored to series-connected capacitors C3 and C4 is sequentially accumulated in capacitor C5 at this time (FIGS. 9(C), 9(D)). As a result, a potential stepped down to ½ VDD referenced to the system ground potential VSS can be supplied as the output potential to capacitor C5.

Figure 10:
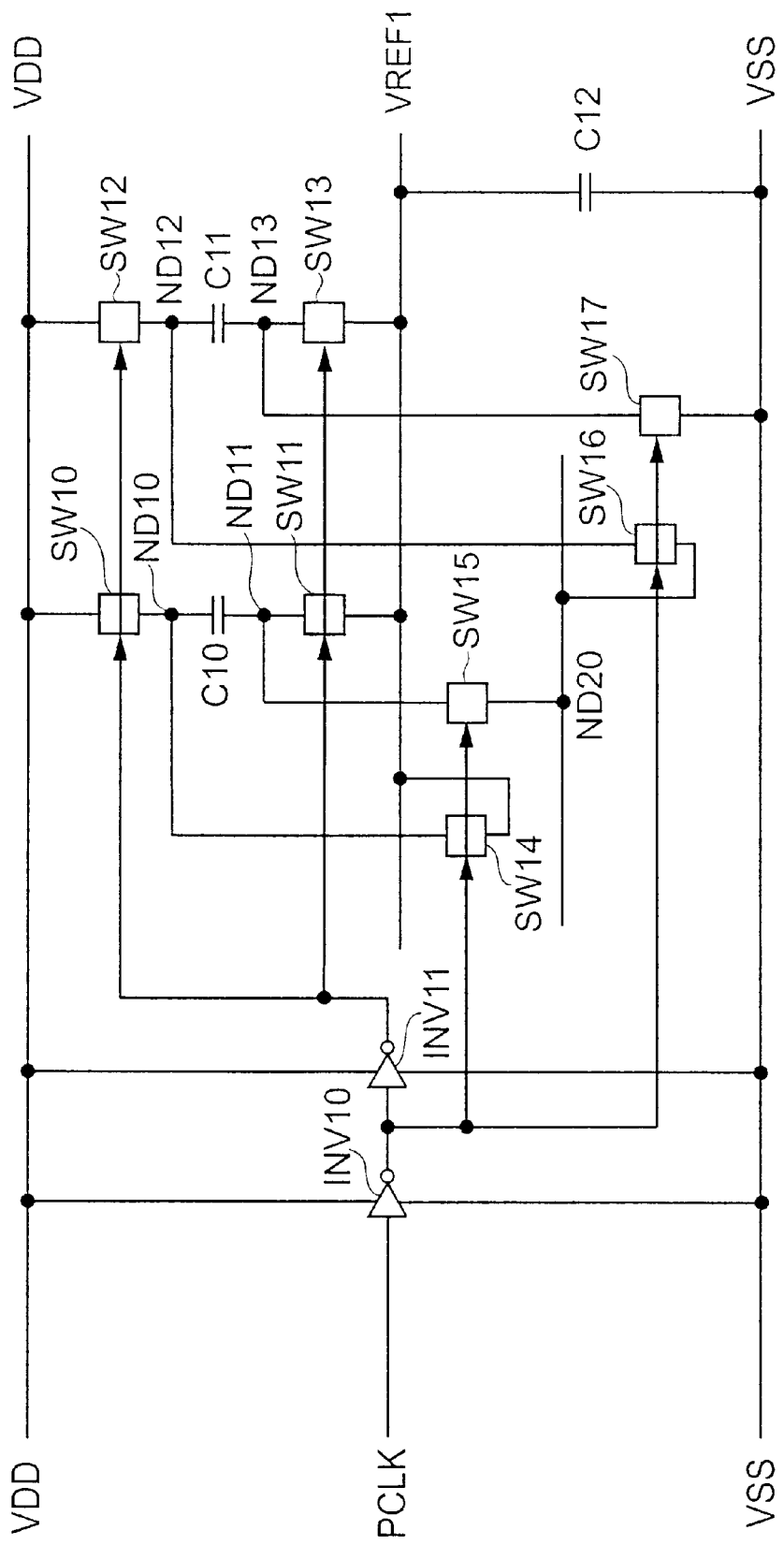
FIG. 10 is a schematic diagram of a charge pump type ⅔ step-down circuit.

FIG. 10 shows the configuration of an exemplary charge pump type ⅔ step-down circuit. This step-down circuit steps down the potential of power supply potential VDD to ⅔ referenced to system ground potential VSS to generate output potential VREF1. This step-down circuit can be applied as a circuit for directly stepping down the power supply potential of the charge pump step-down circuit.

In this step-down circuit switch SW10, capacitor C10, and switch SW11 are sequentially connected in series between the power supply line and the power output line to which output potential VREF1 is supplied. SW12, capacitor C11, and SW13 series connected in order are also connected between the system power supply line and power output line.

SW14 is connected between node ND10 and the power output line. SW15 is connected between node ND11 and node ND20. SW16 is connected between node ND12 and node ND20. SW17 is connected between node ND13 and ground.

Capacitor C12 is connected between the power output line and ground.

SW14 to SW17 are controlled by output from inverter circuit INV10 to which clock signal PCLK is input. SW10 to SW13 are controlled by output from inverter circuit INV11. The input terminal of inverter circuit INV11 is connected to the output terminal of inverter circuit INV10.

When clock signal PCLK is high in this step-down circuit, SW10 to SW13 are on, SW14 to SW17 are off, and capacitors C10 and C11 are parallel connected between the system power supply line and power output line. When clock signal PCLK goes low, SW10 to SW13 go off, SW14 to SW17 go on, and capacitors C10 and C11 are connected in series between the power output line and ground. Therefore, a voltage corresponding to the charge accumulated in capacitors C10 and C11 when parallel connected is supplied as twice the voltage to the power output line when the capacitors are connected in series.

As a result, charge accumulates in capacitor C12 so that a potential $\frac{2}{3}$ VDD is supplied to the power output line.

It will thus be apparent that various charge pump step-up circuits and step-down circuits and combinations thereof can be used to achieve a b/a charge pump step-down circuit. It will also be obvious that the invention shall not be limited to the circuit designs described above, and various other charge pump type circuits or switching regulators could be used instead.

2.2.2 Switching Control

Switching control of the switching circuit can be provided using two regulators as shown in FIG. 3, or one regulator as shown in FIG. 4. When two regulators are used it is desirable to turn off the power to the regulator that is not selected simultaneously to switching control.

The switching control circuit could be built in to the power supply circuit or to the LCD controller.

If the switching control circuit is in the power supply circuit, the switching signal can be changed based on the result of monitoring the potential stepped down by the charge pump step-down circuit. Because stability can be determined after the power supply circuit starts up by comparing the step-down potential with a reference potential, various potentials can be generated efficiently with low power consumption using a step-down circuit with consistently stable operation after switching without being affected by manufacturing variations.

The switching signal can also be changed based on the monitored results of the output potential supplied from the power supply circuit to the LCD controller. Because stability after the power supply circuit rises can be evaluated from the output potential, various potentials can be generated efficiently with low power consumption using a step-down circuit with consistently stable operation after switching without being affected by manufacturing variations.

Moreover, the pulses of the step-down clock input from the LCD controller to the power supply circuit could be counted. If the time until the power supply circuit stabilizes can be determined at the design stage, various potentials can be generated efficiently with low power consumption using a step-down circuit with consistently stable operation after switching without using complicated circuitry in the power supply circuit.

Furthermore, if the switching control circuit is incorporated into the LCD controller, the switching signal can be changed according to whether a specified wait period has passed. Because in this case the time until the power supply circuit stabilizes can be determined at the design stage, various potentials can be generated efficiently with low power consumption using a step-down circuit with consistently stable operation after switching using a very simple configuration.

2.3 Exemplary Configurations

Specific configurations of power supply circuits described in the above first and second embodiments are described next. A configuration incorporating a power monitoring circuit in the power supply circuit is described next using the charge pump type $\frac{2}{3}$ step-down circuit shown in FIG. 10.

2.3.1 First Exemplary Configuration

This first exemplary configuration relates to a power supply circuit according to the first embodiment of the invention shown in FIG. 3. More specifically, the power supply circuit of this first embodiment selects and outputs the output from one of two regulators for adjusting the system power supply potential and the stepped-down potential based on the result of monitoring the potential output by the step-down circuit, and stops operation of the other regulator.

Figure 11:
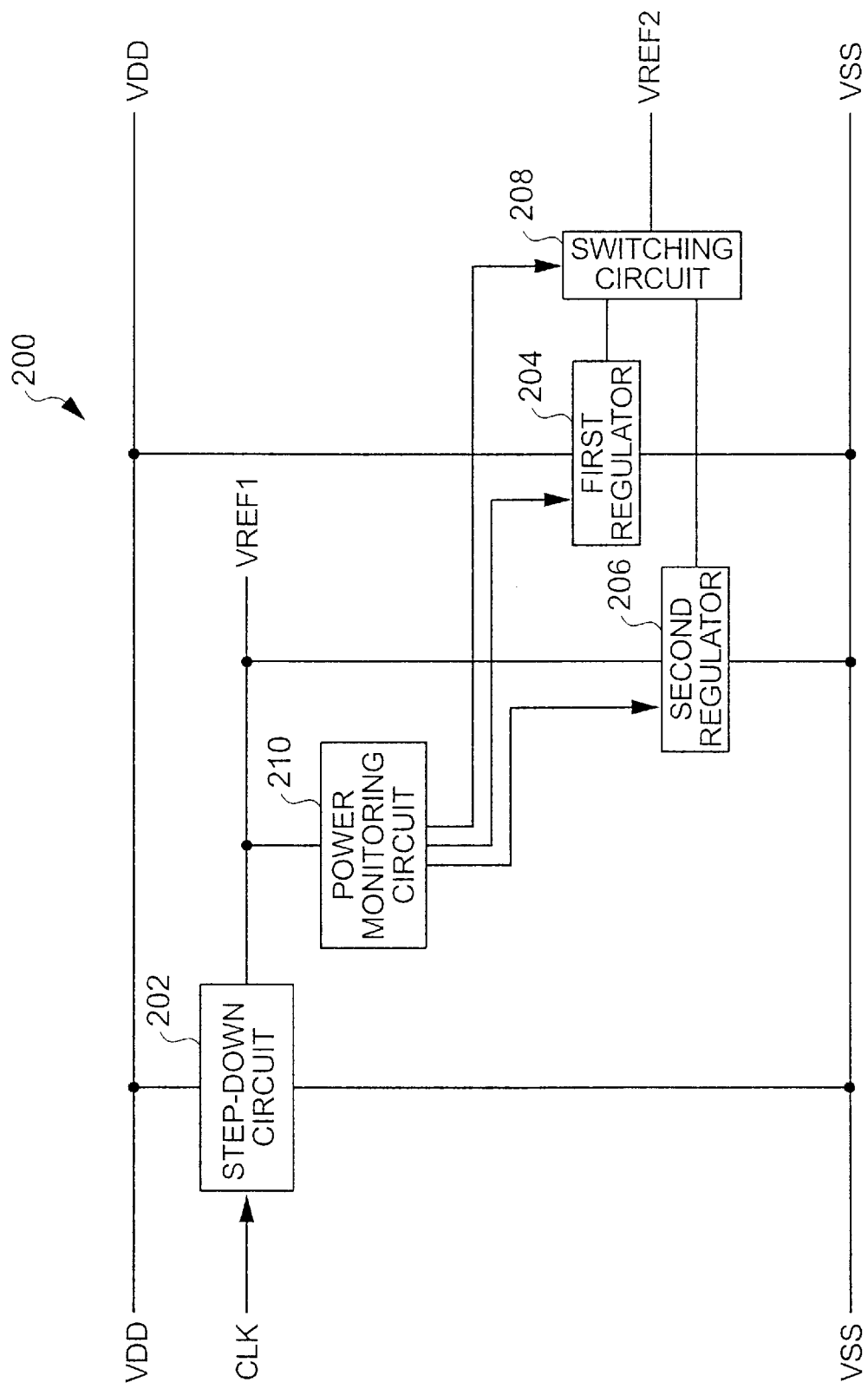
FIG. 11 is a schematic diagram showing the configuration of a power supply circuit according to a first embodiment of the invention.

FIG. 11 is a schematic diagram showing the configuration of a power supply circuit according to this first exemplary configuration.

This power supply circuit 200 steps down power supply potential VDD to step-down potential VREF1 by means of $\frac{2}{3}$ step-down circuit 202 referenced to system ground potential VSS. This $\frac{2}{3}$ step-down circuit 202 is identical to the charge pump $\frac{2}{3}$ step-down circuit shown in FIG. 10.

The first regulator 204 adjusts the potential of power supply potential VDD referenced to system ground potential VSS to generate an adjusted potential. The second regulator 206 adjusts the potential of step-down potential VREF1 referenced to system ground potential VSS to generate an adjusted potential. Switching circuit 208 selects the adjusted potential output by either first or second regulator 204, 206 to generate output potential VREF2.

The power monitoring circuit 210 monitors step-down potential VREF1 by comparison with a specified reference potential. Based on the result, the power monitoring circuit 210 drives the switching circuit 208 to output the adjusted potential generated by first or second regulator 204 or 206, and stop operation of the regulator that was not selected.

Figure 12:
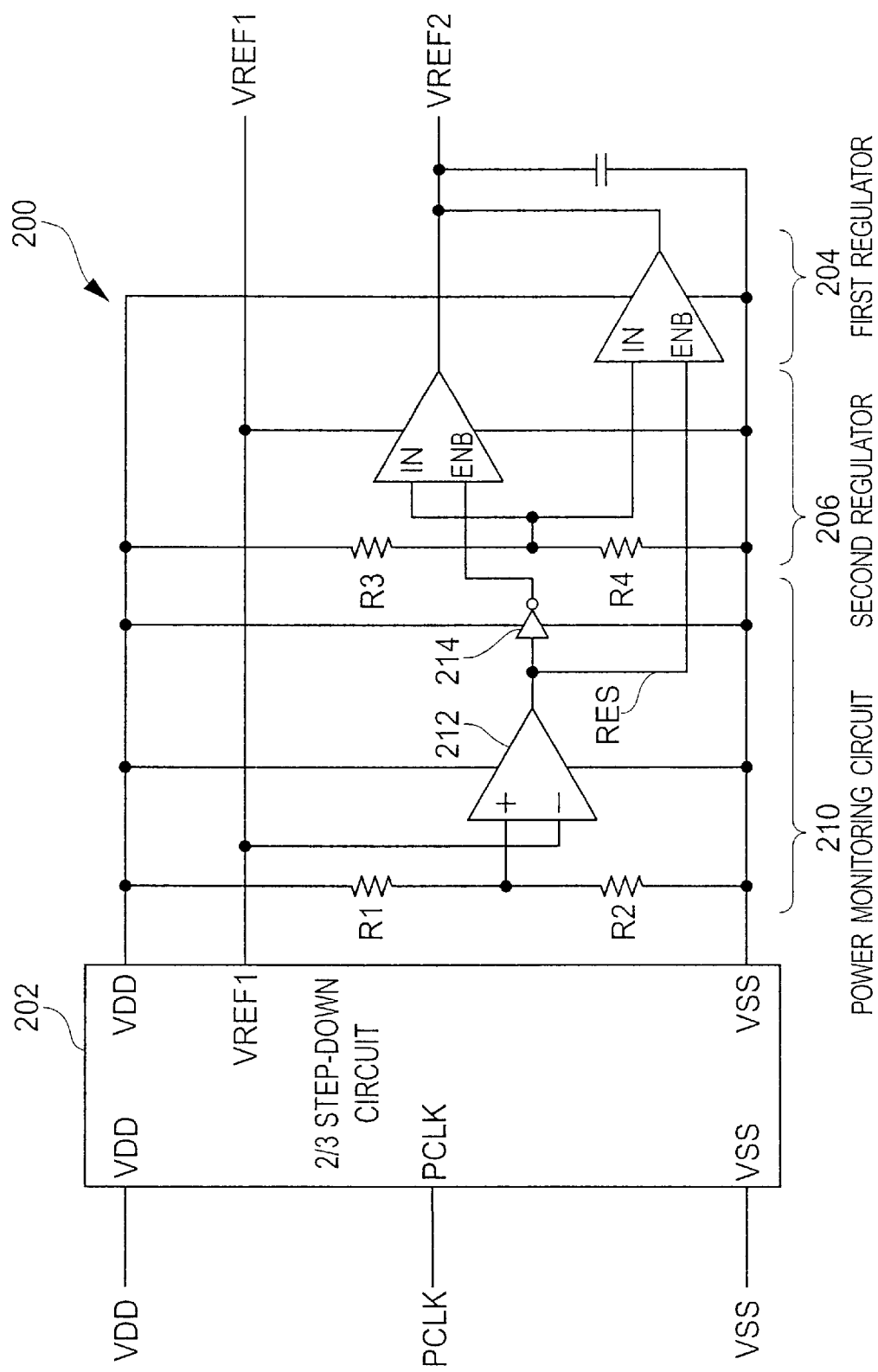
FIG. 12 is a circuit diagram of a power supply circuit according to a first embodiment of the invention.

FIG. 12 is a circuit diagram of a power supply circuit according to this first exemplary configuration.

The operation of the switching circuit shown in FIG. 11 is achieved by setting the output of either the first or second regulator, the outputs of which are connected to a common node, to a high impedance state.

The power monitoring circuit 210 has a comparator 212 for comparing step-down potential VREF1 with the voltage divided potential obtained from resistances R1, R2 connected between power supply potential VDD and system ground potential VSS as a reference potential.

The first regulator 204 impedance converts the voltage at the voltage division node of resistances R3, R4 connected between power supply potential VDD and system ground potential VSS. Operation of this first regulator 204 is controlled by an input signal to terminal ENB, and regulator output goes to a high impedance state when operation stops. Terminal ENB is connected to the output terminal of comparator 212.

The second regulator 206 impedance converts the voltage at the voltage division node of resistances R3, R4 connected between power supply potential VDD and system ground potential VSS. Operation of this second regulator 206 is controlled by an input signal to terminal ENB, and regulator output goes to a high impedance state when operation stops. This terminal ENB is connected to the output terminal of inverter circuit 214. The output of comparator 212 is connected to the input terminal of inverter circuit 214.

With this power supply circuit 200, therefore, power monitoring circuit 210 monitors the step-down potential VREF1 generated by ⅔ step-down circuit 202 as shown in FIG. 10, and stops operation of first or second regulator 204 or 206. More specifically, when step-down potential VREF1 is below the reference potential, operation of second regulator 206 is stopped by, for example, stopping the power supply, and the adjusted potential output by first regulator 204 is output as the output potential VREF2. When step-down potential VREF1 rises and stabilizes after the power supply turns on, the power supply to first regulator 204 is stopped, for example, to stop operation of the first regulator 204, and the adjusted potential output by the second regulator 206 is then output as output potential VREF2.

Figure 13:
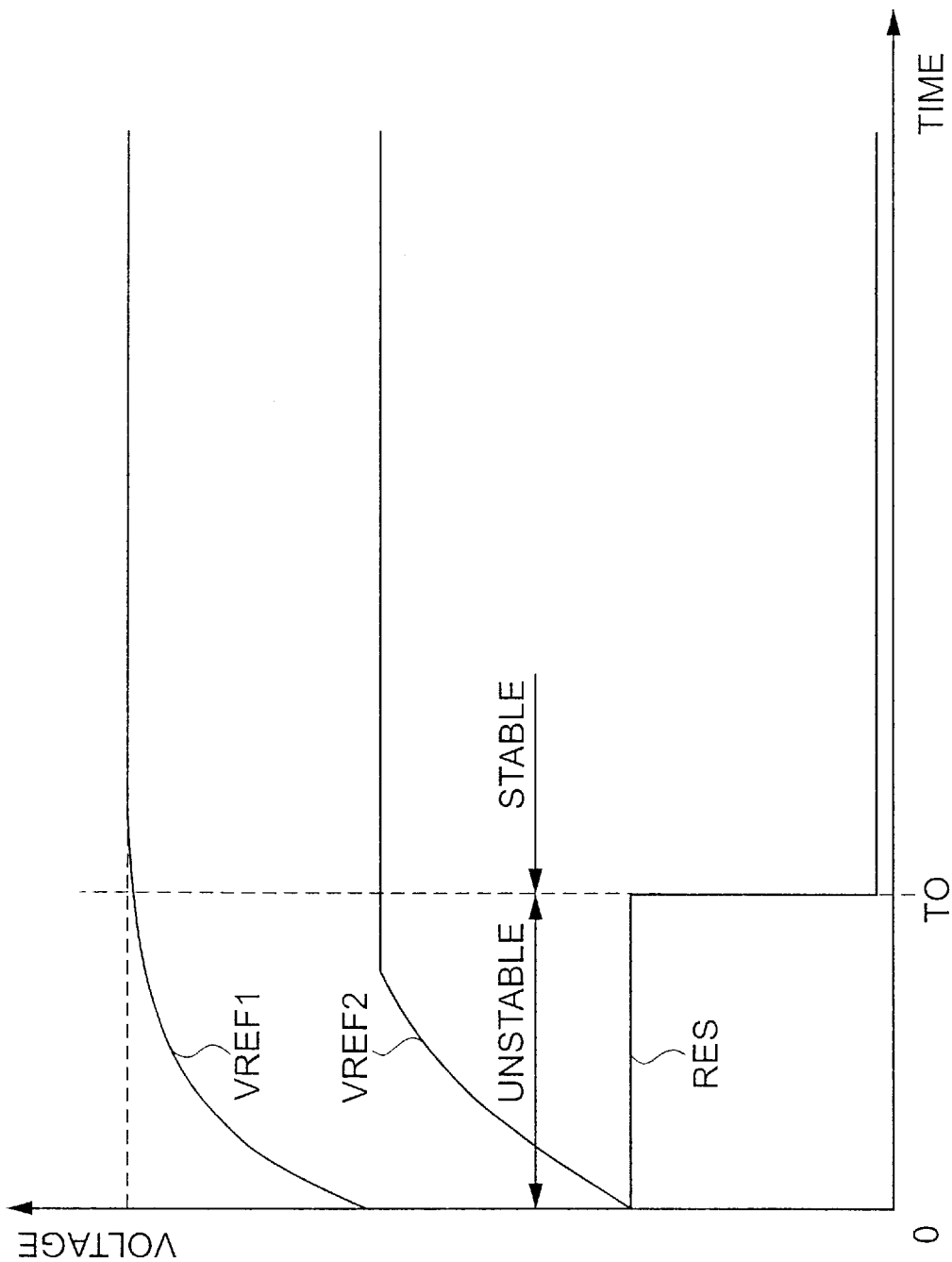
FIG. 13 is a timing chart showing the operating timing of the first embodiment shown in FIG. 11.

As shown in FIG. 13, the potential generated by the first regulator 204 can be supplied to the LCD controller during the unstable period ($t \leq T0$) just after the power supply turns on when the output RES of comparator 212 is high, and the potential generated by second regulator 206 can be supplied to the LCD controller when the power supply then stabilizes ($t > T0$).

It is therefore possible to provide a power supply circuit that rises quickly after the power turns on and can thereafter generate a desired potential efficiently with low power consumption.

2.3.2 Second Exemplary Configuration

This second configuration relates to a power supply circuit according to the second embodiment of the invention shown in FIG. 4. More specifically, the power supply circuit of this second embodiment selects and outputs to the regulator either power supply potential VDD or step-down potential VREF1 based on the result of monitoring the stepped-down potential output by the step-down circuit.

This second configuration reduces the number of regulators compared with the first configuration described above, and can therefore reduce circuit size.

Figure 14:
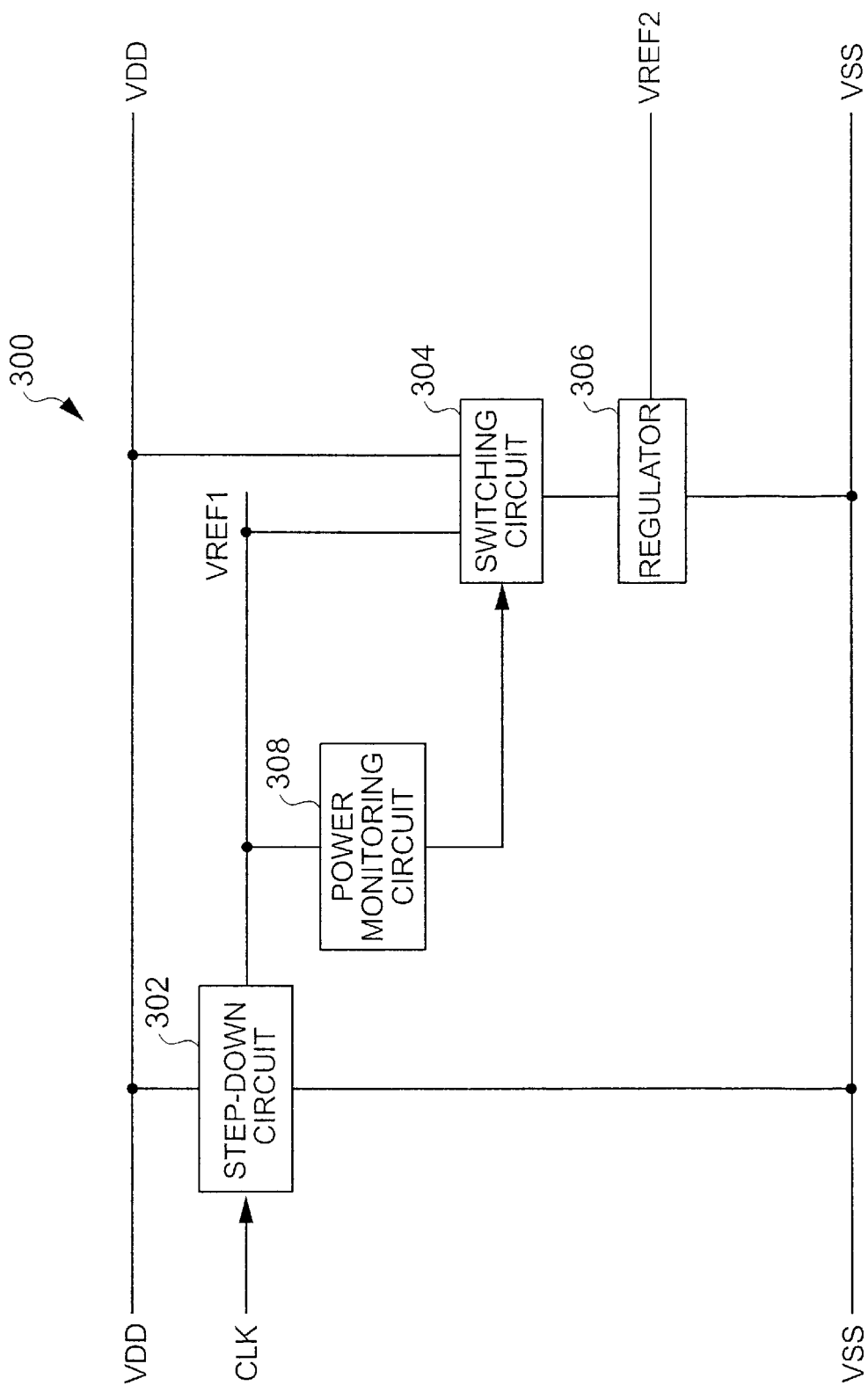
FIG. 14 is a schematic diagram of the power supply circuit according to a second embodiment of the invention.

FIG. 14 is a schematic diagram of the power supply circuit according to this second exemplary configuration.

This power supply circuit 300 steps down power supply potential VDD to step-down potential VREF1 by means of ⅔ step-down circuit 302 referenced to system ground potential VSS. This ⅔ step-down circuit 302 is identical to the charge pump ⅔ step-down circuit shown in FIG. 10.

Switching circuit 304 selects and outputs to regulator 306 either power supply potential VDD or step-down potential VREF1. The regulator 306 adjusts the potential selected by switching circuit 304 to generate output potential VREF2.

The power monitoring circuit 308 monitors step-down potential VREF1 by comparison with a specified reference potential. Based on the result, the power monitoring circuit 308 drives the switching circuit 304 to output either power supply potential VDD or step-down potential VREF1.

Figure 15:
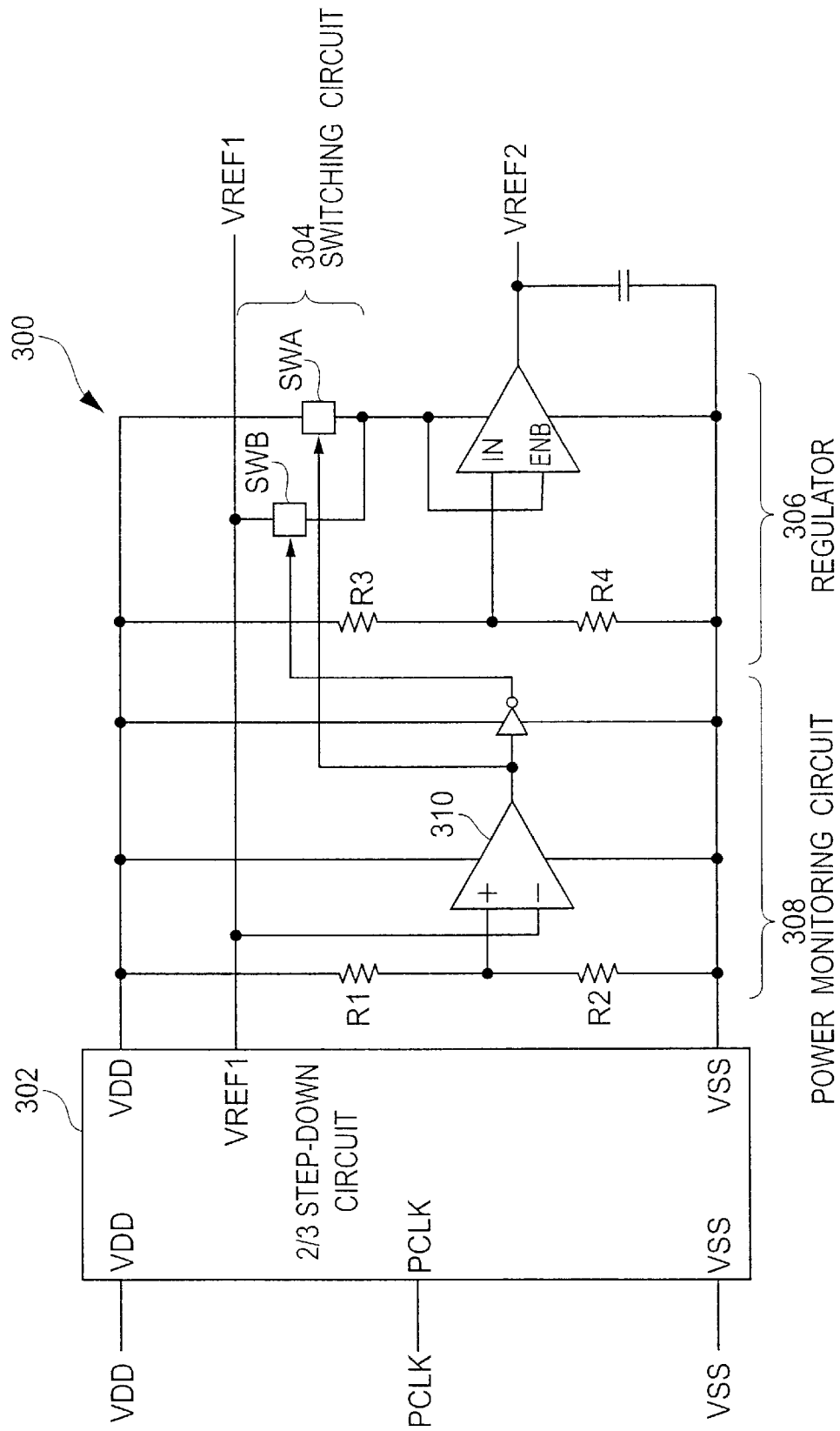
FIG. 15 is a circuit diagram of a power supply circuit according to a second embodiment of the invention.

FIG. 15 is a circuit diagram showing a power supply circuit according to this second exemplary configuration.

The power monitoring circuit 308 has a comparator 310 for comparing step-down potential VREF1 with the voltage divided potential obtained from resistances R1, R2 connected between power supply potential VDD and system ground potential VSS as a reference potential.

The switching circuit 304 has switches SWA and SWB. Based on the output from comparator 310, either switch SWA or SWB is conductive to supply either power supply potential VDD or step-down potential VREF1 to the regulator 306.

The regulator 306 impedance converts the voltage at the voltage division node of resistances R3, R4 connected between power supply potential VDD and system ground potential VSS. The regulator 306 also adjusts the potential between system ground potential VSS and the potential output by switching circuit 304.

This power supply circuit 300 therefore monitors the step-down potential VREF1 generated by ⅔ step-down circuit 302 as shown in FIG. 10 by means of power monitoring circuit 308, and supplies either power supply potential VDD or step-down potential VREF1 to the regulator 306. More specifically, when step-down potential VREF1 is lower than a reference potential, switch SWA of switching circuit 304 is on and SWB is off, and power supply potential VDD is supplied to regulator 306. When step-down potential VREF1 then stabilizes and rises above the reference potential after the power supply turns on, switch SWA of switching circuit 304 turns off and SWB turns on, and step-down potential VREF1 is supplied to the regulator 306.

As a result, the potential-adjusted power supply potential VDD can be supplied to the LCD controller during the unstable period just after the power supply turns on, and the potential-adjusted step-down potential VREF1 can be supplied to the LCD controller when the supply stabilizes after the system power supply turns on.

It is therefore possible to provide a power supply circuit that rises quickly after the power turns on and can thereafter generate a desired potential efficiently with low power consumption. A stable output potential can also be supplied using fewer regulators.

2.3.3 Third Exemplary Configuration

This third configuration relates to a power supply circuit according to the second embodiment of the invention shown in FIG. 4. More specifically, the power supply circuit of this second embodiment selects and outputs to the regulator either power supply potential VDD or step-down potential VREF1 based on the result of monitoring the potential of output potential VREF2.

The circuit size of this third configuration is small because the number of regulators can be reduced compared with the above first configuration as in the second configuration.

Figure 16:
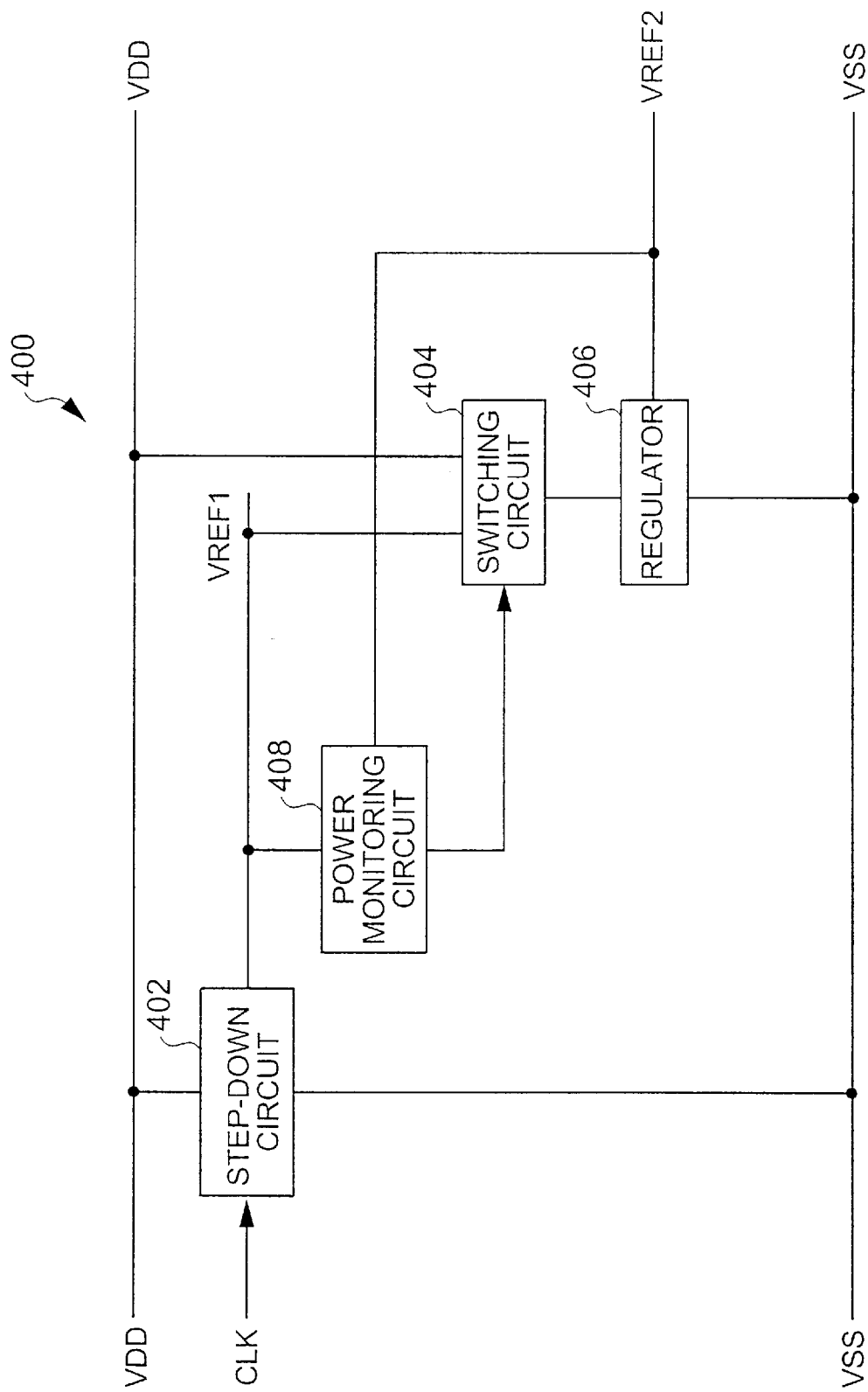
FIG. 16 is a schematic diagram of the power supply circuit according to a third embodiment of the invention.

FIG. 16 is a schematic diagram showing a power supply circuit according to this third exemplary configuration.

This power supply circuit 400 steps down power supply potential VDD to step-down potential VREF1 by means of ⅔ step-down circuit 402 referenced to system ground potential VSS. This ⅔ step-down circuit 402 is identical to the charge pump ⅔ step-down circuit shown in FIG. 10.

Switching circuit 404 selects and outputs to regulator 406 either power supply potential VDD or step-down potential VREF1. The regulator 406 adjusts the potential selected by switching circuit 404 to generate output potential VREF2.

The power monitoring circuit 408 monitors output potential VREF2 by comparison with a specified reference potential. Based on the result, the power monitoring circuit 408 drives the switching circuit 404 to output either power supply potential VDD or step-down potential VREF1.

Figure 17:
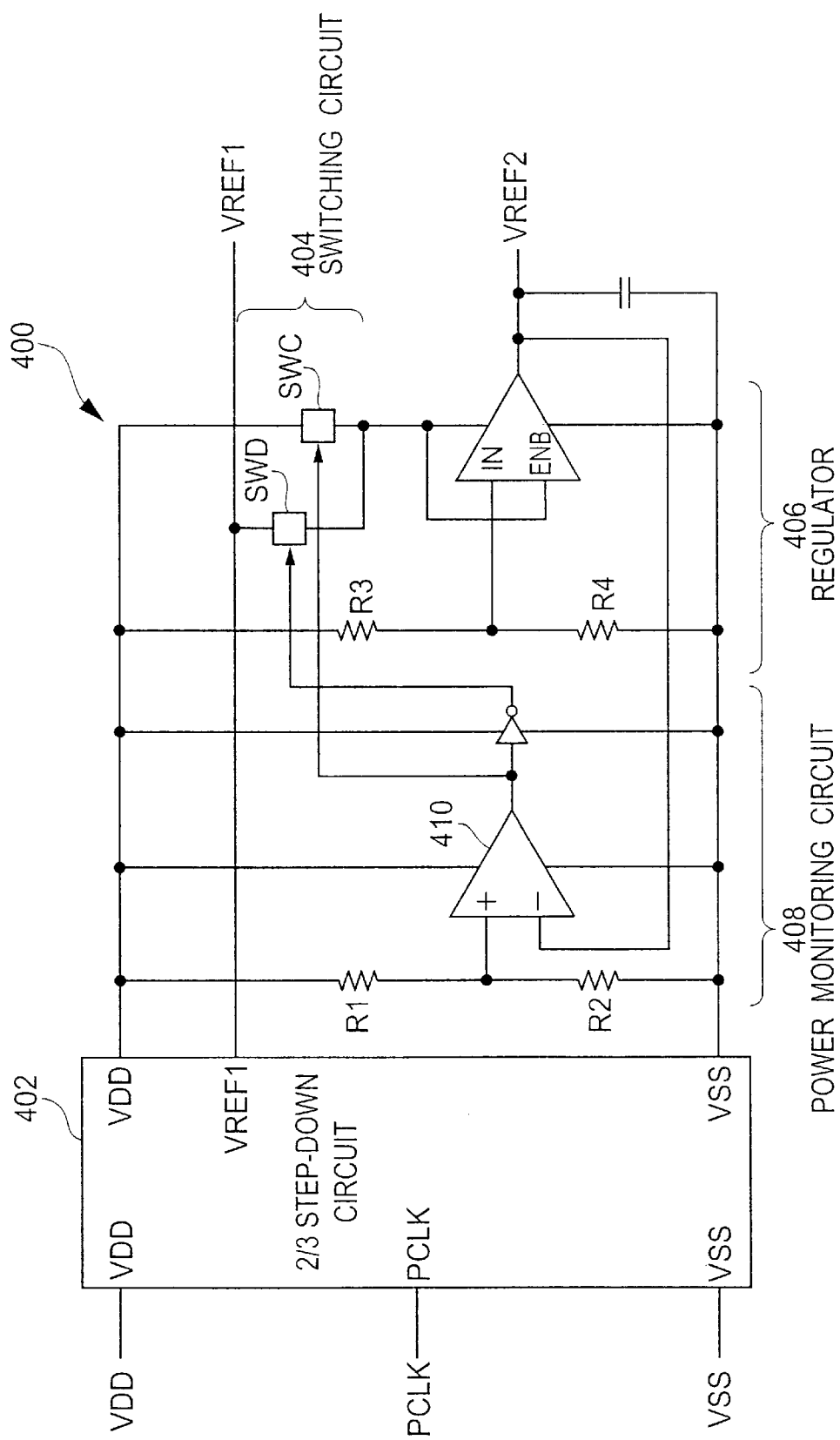
FIG. 17 is a circuit diagram of a power supply circuit according to a third embodiment of the invention.

FIG. 17 is a circuit diagram showing a power supply circuit according to this third exemplary configuration.

The power monitoring circuit 408 has a comparator 410 for comparing output potential VREF2 with the voltage divided potential obtained from resistances R1, R2 connected between power supply potential VDD and system ground potential VSS as a reference potential.

The switching circuit 404 has switches SWC and SWD. Based on the output from comparator 310, either switch SWC or SWD is conductive to supply either power supply potential VDD or step-down potential VREF1 to the regulator 406.

The regulator 406 impedance converts the voltage at the voltage division node of resistances R3, R4 connected between power supply potential VDD and system ground potential VSS. The regulator 406 also adjusts the potential between system ground potential VSS and the potential output by switching circuit 404.

This power supply circuit 400 therefore monitors the step-down potential VREF1 generated by $\frac{2}{3}$ step-down circuit 402 as shown in FIG. 10 by means of power monitoring circuit 408, and supplies either power supply potential VDD or step-down potential VREF1 to the regulator 406. More specifically, when step-down potential VREF1 is lower than a reference potential, switch SWC of switching circuit 404 is on and SWD is off, and power supply potential VDD is supplied to regulator 406. When step-down potential VREF1 then stabilizes and rises above the reference potential after the power supply turns on, switch SWC of switching circuit 404 turns off and SWD turns on, and step-down potential VREF1 is supplied to the regulator 406.

As a result, the potential-adjusted power supply potential VDD can be supplied to the LCD controller during the unstable period just after the power supply turns on, and the potential-adjusted step-down potential VREF1 can be supplied to the LCD controller when the supply stabilizes after the system power supply turns on.

It is therefore possible to provide a power supply circuit that rises quickly after the power turns on and can thereafter generate a desired potential efficiently with low power consumption. A stable output potential can also be supplied using fewer regulators.

It is also possible to improve drive capacity by using the power supply potential VDD before it is stepped down when the output potential drops after the circuit stabilizes.

It should be noted that the first embodiment shown in FIG. 11 and FIG. 12 can also be configured to monitor the potential of output potential VREF2.

2.3.4 Fourth Exemplary Configuration

This fourth exemplary configuration is a variation of the power supply circuit shown in the above second and third configurations. More specifically, the power supply circuit according to this fourth embodiment selects and supplies to the regulator either power supply potential VDD or step-down potential VREF1 based on the result of monitoring step-down potential VREF1 and output potential VREF2.

Figure 18:
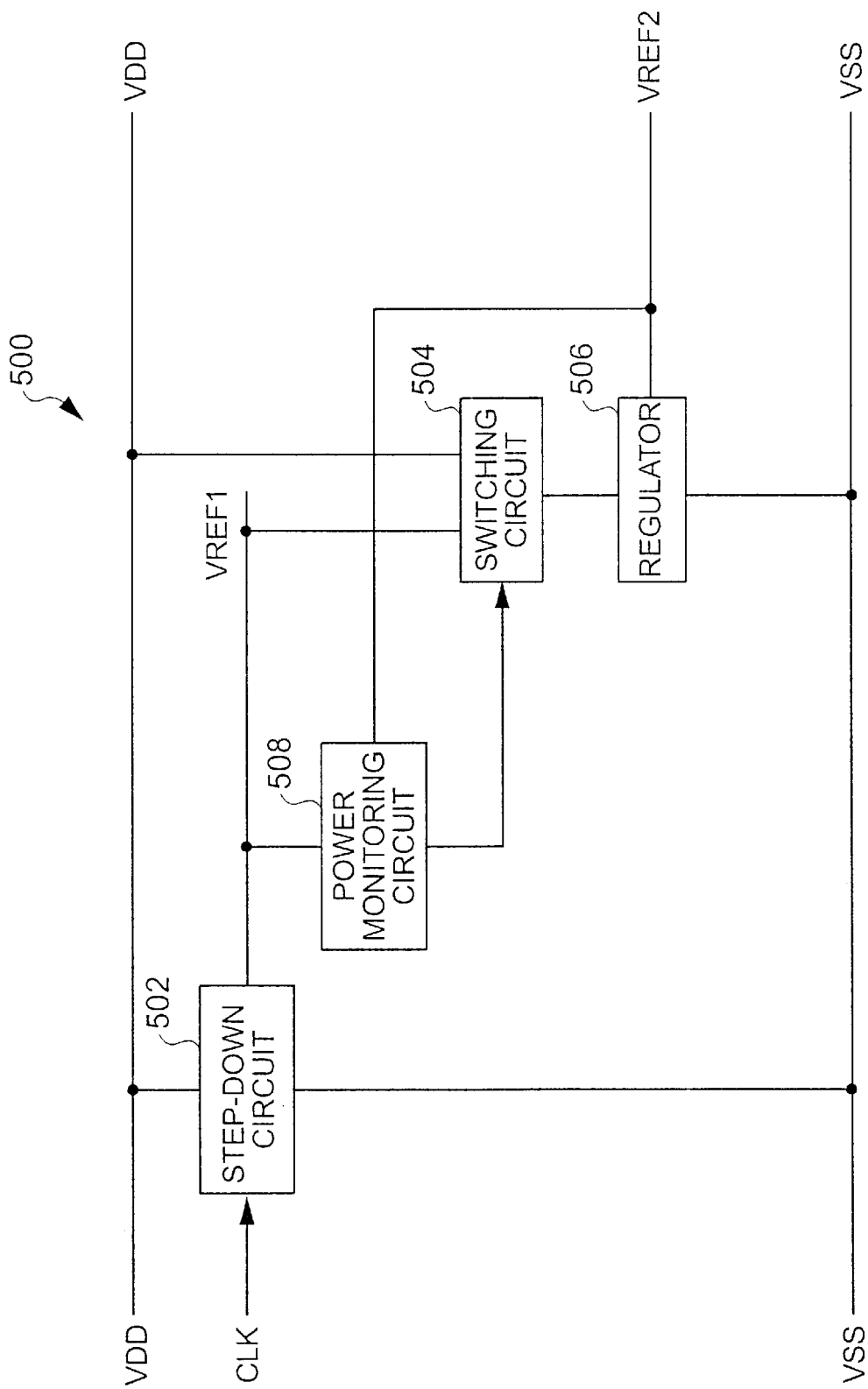
FIG. 18 is a schematic diagram of the power supply circuit according to a fourth embodiment of the invention.

FIG. 18 is a schematic diagram showing a power supply circuit according to this fourth exemplary configuration.

This power supply circuit 500 steps down power supply potential VDD to step-down potential VREF1 by means of $\frac{2}{3}$ step-down circuit 502 referenced to system ground potential VSS. This $\frac{2}{3}$ step-down circuit 502 is identical to the charge pump $\frac{2}{3}$ step-down circuit shown in FIG. 10.

Switching circuit 504 selects and outputs to regulator 506 either power supply potential VDD or step-down potential VREF1. The regulator 506 adjusts the potential selected by switching circuit 504 to generate output potential VREF2.

The power monitoring circuit 508 monitors step-down potential VREF1 by comparison with a specific first reference potential, and monitors output potential VREF2 by comparison with a specified second reference potential. Based on either result, the power monitoring circuit 508 drives the switching circuit 504 to output either power supply potential VDD or step-down potential VREF1.

More precise switching control can be provided when thus comprised so that switching is controlled based on the result of monitoring the step-down potential during the unstable period after the power supply turns on, that is, until the supply stabilizes, and switching to the step-down potential to improve drive capacity when the potential output by the regulator drops in the stable period due to an unexpected load [impossible <?>, sic] change.

2.3.5 Fifth Exemplary Configuration

With the fifth embodiment described below the LCD controller further reduces power consumption by the power supply circuit by applying a sleep signal and a discharge signal in addition to the step-down clock signal PCLK. More specifically, the sleep signal can be applied to stop the charge pumping operation generating the output potential, and the discharge signal can be applied to forcibly discharge charge accumulated on the power supply line, for example, to prevent degrading the quality of the LCD.

Figure 19:
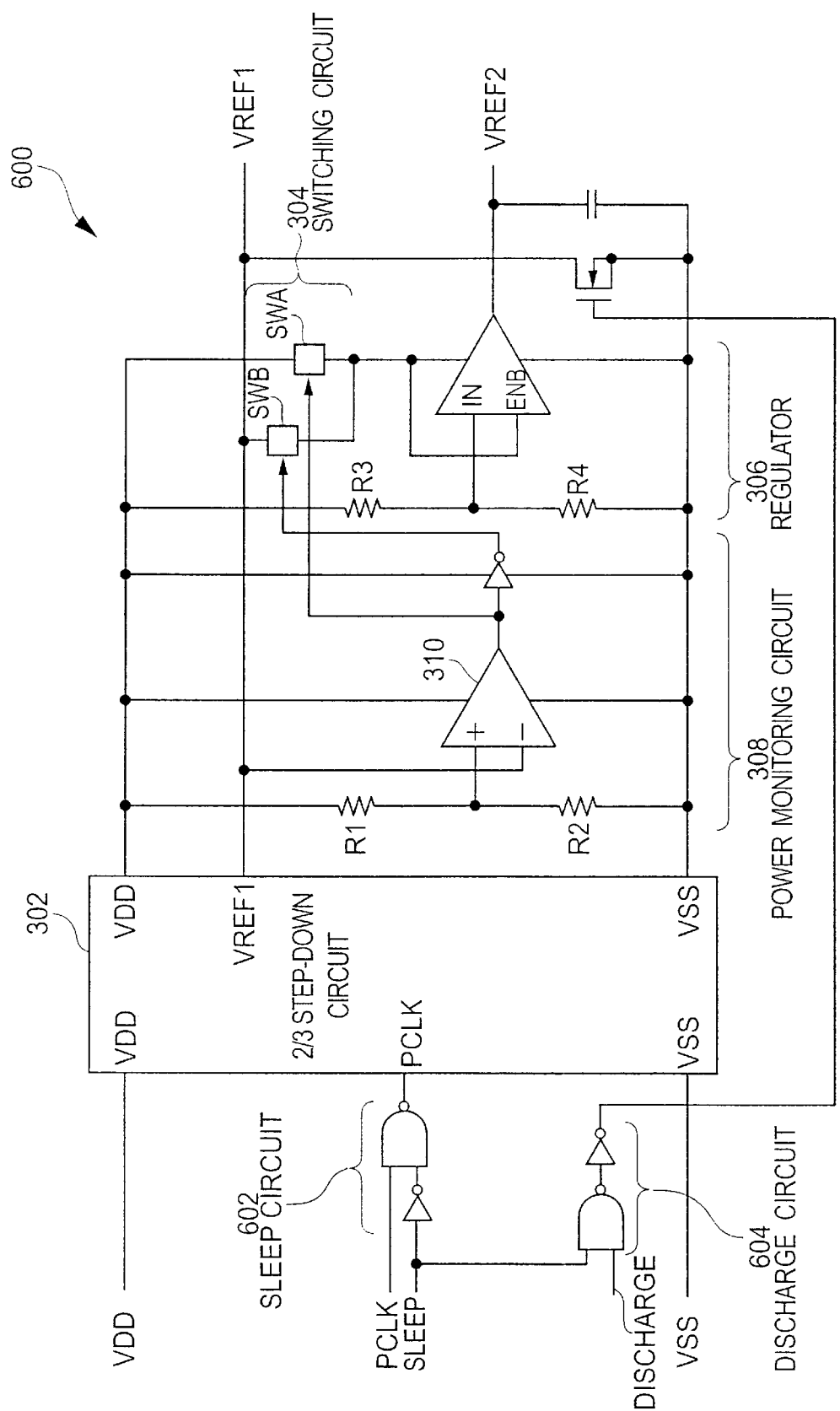
FIG. 19 is a circuit diagram of a power supply circuit according to a fourth embodiment of the invention.

FIG. 19 is a circuit diagram of a power supply circuit according to this fifth embodiment.

This embodiment adds a circuit enabling sleep control by applying the sleep signal and discharge control by applying the discharge signal to the power supply circuit according to the second exemplary configuration shown in FIG. 15. Like parts in FIG. 19 and FIG. 15 are therefore identified by like reference numeral, and further description thereof is omitted below.

The sleep circuit 602 providing the above-noted sleep control in the power supply circuit 600 of this fifth embodiment masks the step-down clock signal PCLK with the sleep signal to stop charge pumping by the $\frac{2}{3}$ step-down circuit 302.

The discharge circuit 604 enabling the above-noted discharge control in this power supply circuit 600 outputs the logical AND of the sleep signal and discharge signal. An NMOS transistor 606 gate controlled by the output signal from discharge circuit 604 is therefore disposed between the ground and supply line to which step-down potential VREF1 is applied to force the supply line to which step-down potential VREF1 is applied to system ground potential VSS and thereby forcibly discharge the charge accumulated on the supply line.

3. Startup Sequence

The startup sequence of a LCD using a power supply circuit according to the present invention when the power supply turns on is described next.

Figure 20:
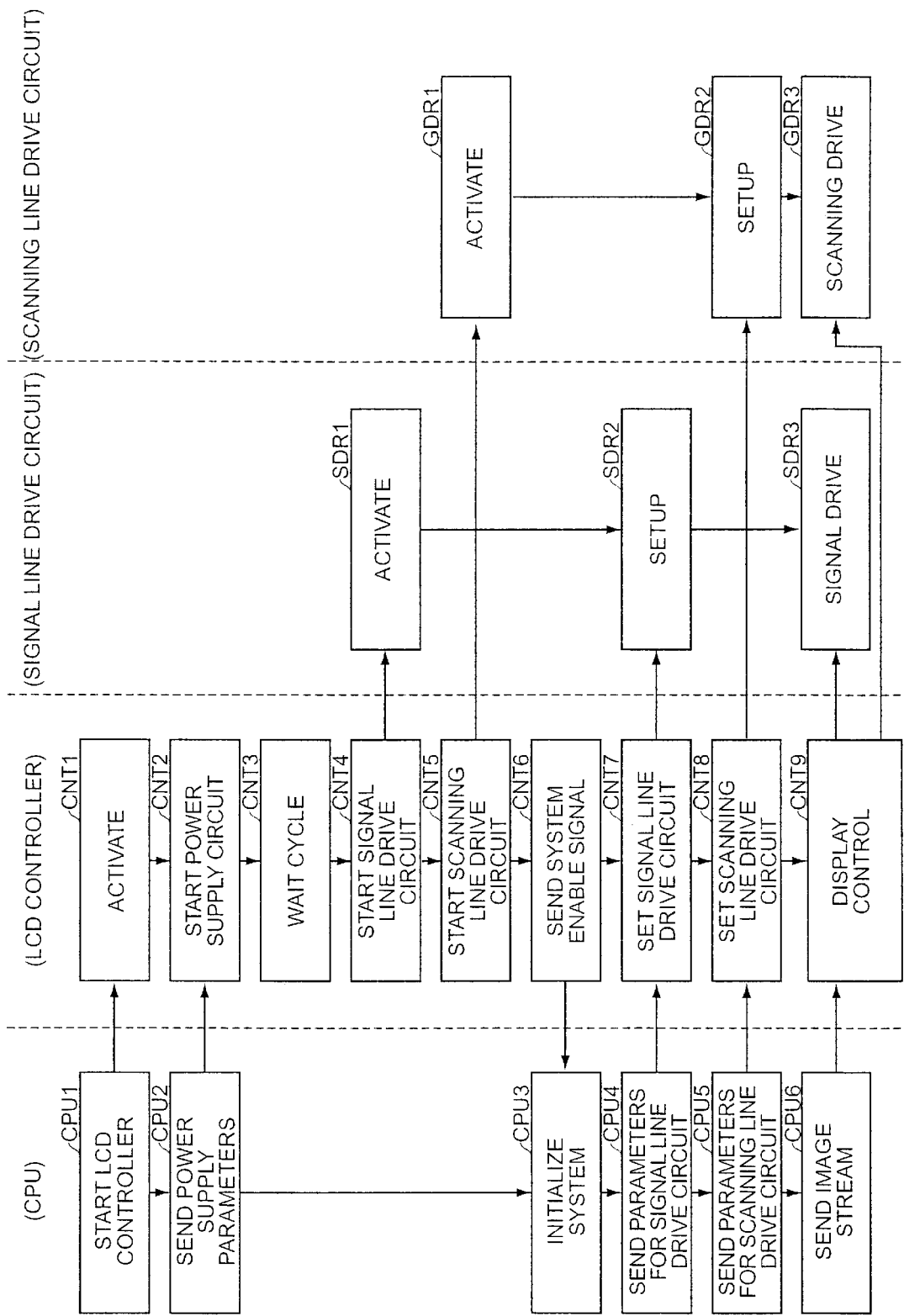
FIG. 20 is a flow chart showing an exemplary startup sequence for a LCD.

An exemplary startup sequence for LCD 10 is shown in FIG. 20.

After activating a reset when the system power turns on, the host activates the LCD controller 60 (CPU1). This can be achieved by, for example, canceling the LCD controller 60 reset.

The LCD controller 60 then starts up (CNT1).

The host then sends parameters such as the step-up/step-down clock frequency determining the step-up efficiency and step-down efficiency of the power supply circuit to the LCD controller 60 (CNT2). The LCD controller 60 then activates the power supply circuit (cancels the reset signal) (CNT2), and waits for a predetermined wait cycle (CNT3). After the specified wait cycle passes (CNT3), the LCD controller 60 starts (cancels the reset signal) the signal line drive circuit 30 (CNT4), and starts the scanning line drive circuit 50 (CNT5).

The signal line drive circuit 30 and scanning line drive circuit 50 thus start up when instructed by the LCD controller 60 (SDR1, GDR1).

The LCD controller 60 then sends a system enable signal (CNT6) to notify the host the LCD is ready to be started. The host initializes the system when it receives the system enable signal (CPU3).

The host also sends parameters for the signal line drive circuit and parameters for the scanning line drive circuit to the LCD controller 60 (CPU4, CPU5). The parameters for the signal line drive circuit include, for example, settings specifying the signal lines to be driven. Parameters for the scanning line drive circuit include, for example, settings specifying the scanning lines for scanning.

When the LCD controller 60 receives the parameters for the signal line drive circuit from the host, it runs a process for setting the signal line drive circuit 30 according to the received parameters (CNT7, SDR2). When the LCD controller 60 receives the parameters for the scanning line drive circuit from the host, it runs a process for setting the scanning line drive circuit 50 according to the received parameters (CNT8, GDR2).

The host then sends an image stream to the LCD controller 60 (CPU6), and the LCD controller 60 controls the signal line drive circuit 30 and scanning line drive circuit 50 to control image display (CNT9). The signal line drive circuit 30 and scanning line drive circuit 50 then respectively apply signal drive (SDR3) and scanning drive (GDR3) to display the image stream on the liquid crystal panel of the LCD.

FIGS. 21(A) and 21(B) show an exemplary startup sequence of the LCD controller and power supply circuit.

Figure 21:
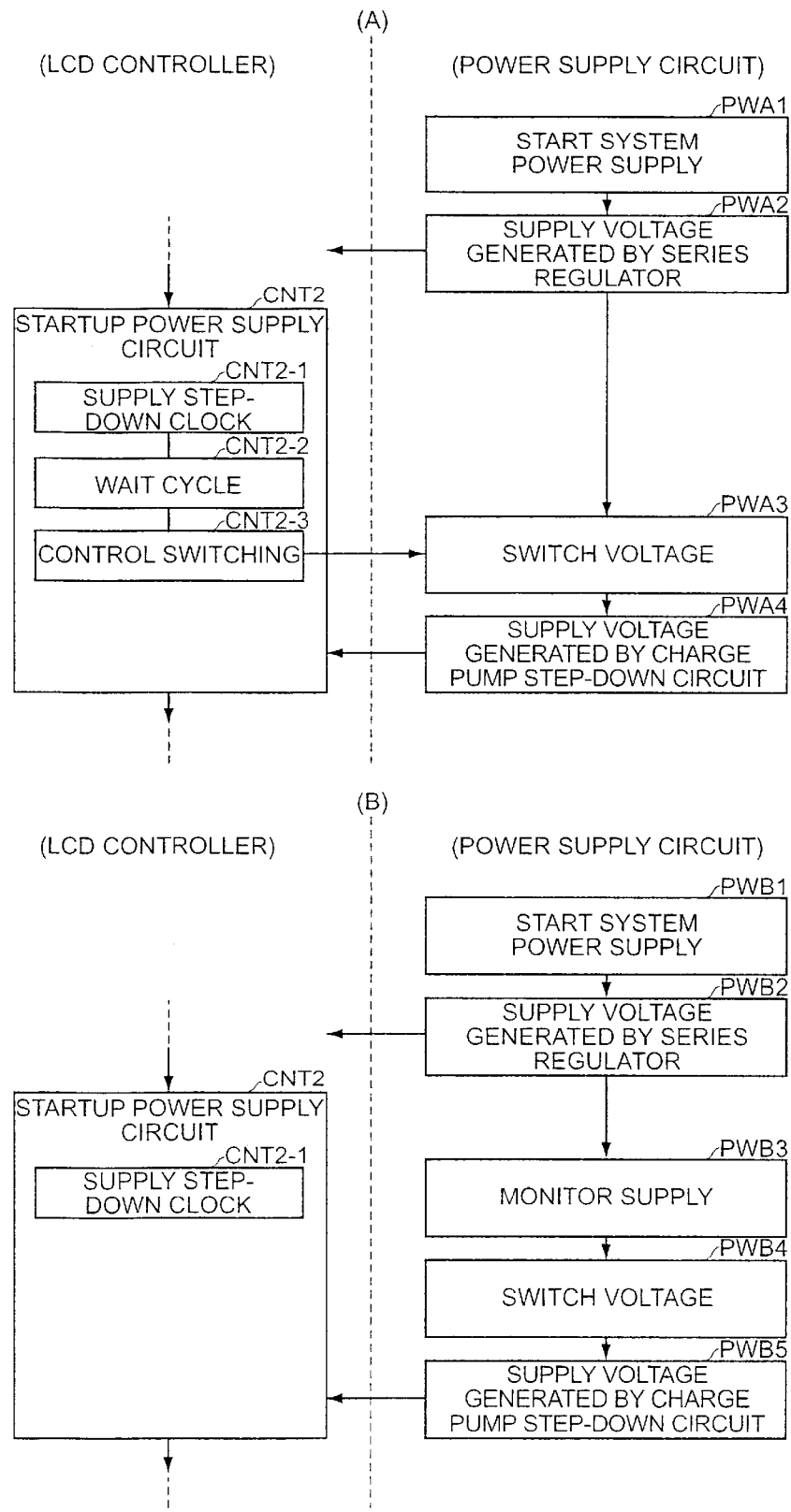
FIG. 21(A) is a flow chart of the startup sequence when switching the power supply circuit is controlled by the LCD controller.
FIG. 21(B) is a flow chart of the startup sequence when switching is controlled inside the power supply circuit.

Note that like steps in FIG. 20 and FIG. 21 are identified by like reference numerals and further description is thus omitted.

FIG. 21(A) shows the startup sequence when the LCD controller controls switching the power supply circuit. FIG. 21(B) shows a startup sequence when switching is controlled inside the power supply circuit.

When switching is controlled by the LCD controller, a potential generating operation starts to provide power when the system power supply turns on (PWA1).

A series regulator adjusts the potential of power supply potential VDD and supplies the adjusted potential to the LCD controller, for example (PWA2).

During the power supply circuit startup phase (CNT2) the LCD controller operates at the supply voltage generated by the series regulator, begins supplying the step-up/step-down clock specified by the host to determine the step-up efficiency and step-down efficiency of the power supply circuit (CNT2-1), and waits for a specified wait cycle (CNT2-2).

When wait cycle ends, the LCD controller changes the switching signal applied to the power supply circuit to switch operation (CNT2-3).

This causes the power supply circuit to switch and output the potential-adjusted step-down potential VREF1 as the output potential (PWA3), and thereafter supply the potential generated by the charge pump step-down circuit to the LCD controller (PWA4).

If switching is controlled inside the power supply circuit, a potential generating operation starts to provide power when the system power supply turns on (PWB1).

A series regulator adjusts the potential of power supply potential VDD and supplies the adjusted potential to the LCD controller, for example (PWB2).

The power supply circuit then monitors the step-down potential or output potential (PWB3). When the power supply circuit rise stabilizes as determined by the monitored results, the power supply circuit controls switching from the potential of the potential-adjusted power supply potential VDD to the potential of the potential-adjusted step-down potential VREF1 (PWB4), and thereafter supplies the potential generated by the charge pump step-down circuit to the LCD controller (PWB5).

By starting up according to a procedure such as described above when the system power supply turns on, it is possible to generate a supply voltage and start up the power supply circuit efficiently with low power consumption with appropriately set parameters.

Although various embodiments of the present invention have been described with reference to the accompanying drawings, it will be apparent to those skilled in the art based on the foregoing description that various changes and modifications may be made. For example, the invention is not applicable only to a liquid crystal display device; rather, the invention can be applied to a display device using an organic electroluminescent panel or a plasma display device, or other type located between the power supply circuit and its controller. Moreover, while the invention has been described in context of a step-down circuit built in to the power supply circuit, the invention is not so limited. It may also be applied to configurations having a step-up circuit built in to the power supply circuit controlled by a controller. The present invention is intended to embrace all such changes and modifications that fall within the spirit and scope of the appended claims.

What is claimed is:

1. A power supply circuit for generating a third potential based on a first potential and a second potential, the power supply circuit comprising:

a step-down circuit configured to generate, based on a switching control signal, a step-down potential by stepping down the second potential using a charge pumping operation;

a first potential adjusting circuit configured to generate an adjusted potential by adjusting the second potential; and a switching circuit configured to select and output as the third potential either the step-down potential or the adjusted potential based on a switching signal.

2. A power supply circuit as described in claim 1, wherein the step-down circuit comprises a second potential adjusting circuit configured to adjust the step-down potential generated by stepping down the second potential.

3. A power supply circuit as described in claim 1, wherein, when the power supply circuit turns on, the switching circuit outputs the adjusted potential as the third potential, and then, after a predetermined period of time elapses, the switching signal changes to cause the switching circuit to switch from outputting the adjusted potential as the third potential to outputting the step-down potential as the third potential.

4. A power supply circuit for generating a third potential based on a first potential and a second potential, the power supply comprising:

a step-down circuit configured to generate, based on a switching control signal, a step-down potential by stepping down the second potential using a charge pumping operation;

a switching circuit configured to select and output as a fourth potential either the step-down potential or the second potential based on a switching signal; and a potential adjusting circuit configured to adjust the fourth potential to the third potential.

5. A power supply circuit as described in claim 4, wherein, when the power supply circuit turns on, the switching circuit outputs the second potential as the fourth potential, and then, after a predetermined period of time elapses, the switching signal changes to cause the switching circuit to switch from outputting the second potential as the fourth potential to outputting the step-down potential as the fourth potential.

6. A power supply circuit as described in claim 5, further comprising a monitoring circuit configured to monitor the step-down potential or the third potential, and wherein the switching signal changes according to a result of the monitoring circuit.

7. A power supply circuit as described in claim 1, wherein at least the third potential is supplied to a first source circuit that supplies the switching control signal.

8. A power supply circuit as described in claim 7, wherein a voltage resistance of the first source circuit is lower than a voltage resistance of a second source circuit that supplies the second potential.

9. A power supply circuit as described in claim 7, wherein the first source circuit comprises a display controller.

10. A method for controlling a power supply circuit that generates a third potential based on a first potential and a second potential, the control method comprising the steps of:

outputting as the third potential an adjusted potential generated by adjusting the second potential;

generating a step-down potential by stepping down the second potential using a charge pumping operation based on a switching control signal; and switching, based on a switching signal, from outputting the adjusted potential as the third potential to outputting the step-down potential as the third potential.

11. A method for controlling a power supply circuit that generates a third potential based on a first potential and a second potential, the control method comprising the steps of:

outputting as the third potential an adjusted potential generated by adjusting the second potential;

generating a step-down potential by stepping down the second potential using a charge pumping operation based on a switching control signal;

switching, based on a switching signal, from outputting the adjusted potential as the third potential to adjusting the step-down potential and outputting the adjusted step-down potential as the third potential.

12. The method as described in claim 10, wherein the switching signal changes after a specific period of time elapses.

13. The method as described in claim 11, wherein the switching signal changes after a specific period of time elapses.

14. The method as described in claim 10, further comprising the step of monitoring the step-down potential or the third potential, wherein the switching signal changes according to a result of the monitoring step.

15. The method as described in claim 11, further comprising the step of monitoring the step-down potential or the third potential, wherein the switching signal changes according to a result of the monitoring step.

16. The method as described in claim 10, wherein at least the third potential is supplied to a source circuit supplying the switching control signal.

17. The method as described in claim 11, wherein at least the third potential is supplied to a source circuit supplying the switching control signal.

18. The method as described in claim 16, wherein a voltage resistance of the source circuit supplying the switching control signal is lower than a voltage resistance of a source circuit supplying the second potential.

19. The method as described in claim 17, wherein a voltage resistance of the source circuit supplying the switching control signal is lower than a voltage resistance of a source circuit supplying the second potential.

20. The method as described in claim 16, wherein the source circuit supplying the switching control signal is a display controller.

21. The method as described in claim 17, wherein the source circuit supplying the switching control signal is a display controller.

* * * * *